United States Patent
Zuk

(10) Patent No.: US 8,484,884 B2
(45) Date of Patent: Jul. 16, 2013

(54) FISHING LURE AND KIT

(76) Inventor: Andrew Zuk, Norco, CA (US)

( * ) Notice: Subject to any disclaimer, the term of this patent is extended or adjusted under 35 U.S.C. 154(b) by 2237 days.

(21) Appl. No.: 11/140,364

(22) Filed: May 28, 2005

(65) Prior Publication Data

US 2006/0016118 A1    Jan. 26, 2006

Related U.S. Application Data

(60) Provisional application No. 60/591,249, filed on Jul. 26, 2004.

(51) Int. Cl.
*A01K 85/00* (2006.01)
*A01K 85/01* (2006.01)

(52) U.S. Cl.
USPC .................... 43/42.09; 43/42.06; 43/42.28

(58) Field of Classification Search
USPC ............ 43/42.28, 42.24, 42.26, 42.09, 42.06; 403/322.2, 325, DIG. 6, 321, 322; 279/75, 279/74, 79, 80, 82, 29, 30, 24, 904, 905; 408/239 R, 240, 238, 198, 197
See application file for complete search history.

(56) References Cited

U.S. PATENT DOCUMENTS

| | | | | |
|---|---|---|---|---|
| 567,310 A * | 9/1896 | Gaide | | 43/42.28 |
| 1,069,093 A * | 7/1913 | Faught | | 43/42.28 |
| 1,168,540 A * | 1/1916 | Musselman | | 279/75 |
| 1,264,658 A * | 4/1918 | King | | 43/42.28 |
| 1,318,072 A * | 10/1919 | Gottschalk | | 43/42.28 |
| 1,454,820 A * | 5/1923 | Readle | | 43/42.28 |
| 1,457,511 A * | 6/1923 | Evans | | 279/75 |
| 1,457,550 A * | 6/1923 | Runkel | | 279/30 |
| 1,468,732 A * | 9/1923 | Bradbury | | 279/75 |
| 1,533,044 A * | 4/1925 | Smith | | 279/30 |
| 1,600,653 A * | 9/1926 | Steenstrup | | 43/42.09 |
| 1,612,264 A * | 12/1926 | Cressey | | 43/42.28 |
| 1,710,102 A * | 4/1929 | Moore | | 43/42.28 |
| 1,803,560 A * | 5/1931 | Rodin | | 43/36 |
| 1,803,561 A * | 5/1931 | Rodin | | 43/36 |
| 1,867,458 A * | 7/1932 | Keuper | | 43/42.09 |
| 1,913,282 A * | 6/1933 | Major | | 43/42.28 |
| 2,008,894 A * | 7/1935 | Bergstrom | | 279/75 |
| 2,091,457 A * | 8/1937 | Sauer | | 43/42.06 |
| 2,167,334 A * | 7/1939 | Hayes | | 43/42.06 |
| 2,167,335 A * | 7/1939 | Hayes | | 43/42.06 |
| 2,185,668 A * | 1/1940 | Hurdle | | 43/42.28 |

(Continued)

FOREIGN PATENT DOCUMENTS

| EP | 1238732 A1 * | 9/2002 |
|---|---|---|
| FR | 2560949 A1 * | 9/1985 |

(Continued)

*Primary Examiner* — Darren W Ark
(74) *Attorney, Agent, or Firm* — Donn K. Harms

(57) ABSTRACT

A fishing lure is described, having a head with a release mechanism and a removable tail. Because the tail can be released, fish caught on hooks can be released quickly, and new tails with new hooks rapidly attached to the same head. Multiple tails may be equipped with different lure skirts, for different fish and/or different conditions, and rapidly changed out in the course of fishing. A tail including a drag chute released by a fish strike, attachable to the same head, is also disclosed. A dive wing, attachable to the removable tails, is also disclosed. Tails can include bait scent chambers and release holes and water jets to attract fish. A kit with combinations of heads, tails, dive wings, and other parts and accessories is also disclosed.

14 Claims, 31 Drawing Sheets

U.S. PATENT DOCUMENTS

| | | | | |
|---|---|---|---|---|
| 2,237,534 A * | 4/1941 | Van Der Clute | | 43/42.28 |
| 2,290,512 A * | 7/1942 | Weesner | | 43/42.09 |
| 2,317,781 A * | 4/1943 | Lehto | | 43/42.06 |
| 2,365,502 A * | 12/1944 | Weesner | | 43/42.28 |
| 2,397,968 A * | 4/1946 | Lind | | 43/42.19 |
| 2,465,064 A * | 3/1949 | Colosimo | | 43/42.09 |
| 2,466,243 A * | 4/1949 | Johnson | | 43/43.13 |
| 2,541,782 A * | 2/1951 | Rodin | | 43/42 |
| 2,611,986 A * | 9/1952 | Silva | | 43/42.28 |
| 2,617,226 A * | 11/1952 | Yoshii | | 43/42.28 |
| 2,625,767 A * | 1/1953 | Pokras | | 43/42.09 |
| 2,750,703 A * | 6/1956 | Puste | | 43/42.28 |
| 2,769,268 A * | 11/1956 | Miller | | 43/42.06 |
| 2,791,058 A * | 5/1957 | Bettini | | 43/42.06 |
| 2,884,733 A * | 5/1959 | Smith | | 43/42.38 |
| 2,902,304 A * | 9/1959 | Smith | | 43/44.83 |
| 2,911,752 A * | 11/1959 | Leppich | | 43/42.28 |
| 2,912,783 A * | 11/1959 | Marks | | 43/42.28 |
| 2,968,886 A * | 1/1961 | Cotroumpas | | 43/42.06 |
| 2,983,065 A * | 5/1961 | Ferguson et. al. | | 43/42.09 |
| 2,994,982 A * | 8/1961 | Murawski | | 43/42.06 |
| 2,994,983 A * | 8/1961 | Best | | 43/42.09 |
| 3,001,318 A * | 9/1961 | Miller | | 43/42.28 |
| 3,009,279 A * | 11/1961 | Jacobson | | 43/42.09 |
| 3,012,356 A * | 12/1961 | Tyson | | 43/42.28 |
| 3,066,434 A * | 12/1962 | Duller | | 43/42.06 |
| 3,091,885 A * | 6/1963 | Ulsh | | 43/42.52 |
| 3,092,925 A * | 6/1963 | Ho et. al. | | 43/42.06 |
| 3,123,370 A * | 3/1964 | Unander | | 279/82 |
| 3,169,336 A * | 2/1965 | Pope | | 43/42.28 |
| 3,219,355 A * | 11/1965 | Fujinuma | | 279/75 |
| 3,260,541 A * | 7/1966 | Sadler et. al. | | 403/325 |
| 3,332,163 A * | 7/1967 | Stewart et. al. | | 43/44.86 |
| 3,359,674 A * | 12/1967 | Strumor | | 43/42.06 |
| 3,388,495 A * | 6/1968 | Minser | | 43/42.09 |
| 3,428,327 A * | 2/1969 | Sindelar | | 279/82 |
| 3,583,715 A * | 6/1971 | Jahrl | | 279/82 |
| 3,608,228 A * | 9/1971 | Borresen et al. | | 43/42.09 |
| 3,621,600 A * | 11/1971 | Dworski | | 43/42.06 |
| 3,672,692 A * | 6/1972 | Fauth | | 279/82 |
| 3,708,903 A * | 1/1973 | Bercz et al. | | 43/42.09 |
| 3,747,946 A * | 7/1973 | Edens | | 279/904 |
| 3,767,218 A * | 10/1973 | Linthicum et al. | | 279/82 |
| 3,835,572 A * | 9/1974 | Mounsey | | 43/42.06 |
| 3,867,781 A * | 2/1975 | Wolfe | | 43/42.09 |
| 3,897,647 A * | 8/1975 | Black | | 43/42.28 |
| 3,947,989 A * | 4/1976 | Bart | | 43/42.09 |
| 3,955,304 A * | 5/1976 | Reid | | 43/42.28 |
| 3,971,152 A * | 7/1976 | Husson, Jr. | | 43/42.06 |
| 3,985,368 A * | 10/1976 | Better et al. | | 279/75 |
| 4,030,225 A * | 6/1977 | Earley | | 43/42.09 |
| 4,054,004 A * | 10/1977 | Schott | | 43/42.09 |
| 4,133,134 A * | 1/1979 | Cheng | | 43/42.06 |
| 4,171,821 A * | 10/1979 | Miller | | 279/75 |
| 4,184,692 A * | 1/1980 | Benson et al. | | 279/75 |
| 4,198,080 A * | 4/1980 | Carpenter | | 403/325 |
| 4,209,182 A * | 6/1980 | Sheldon | | 279/75 |
| 4,210,984 A * | 7/1980 | Koenig | | 43/42.09 |
| 4,215,506 A * | 8/1980 | LeBoeuf | | 43/42.28 |
| 4,273,344 A * | 6/1981 | Benson et al. | | 279/75 |
| 4,290,617 A * | 9/1981 | Yoshida | | 279/75 |
| 4,319,577 A * | 3/1982 | Bofinger et al. | | 279/905 |
| 4,491,445 A * | 1/1985 | Hunger et al. | | 279/75 |
| 4,520,588 A * | 6/1985 | Hindermyer | | 43/42.06 |
| 4,577,875 A * | 3/1986 | Miyakawa | | 279/75 |
| 4,619,067 A * | 10/1986 | West | | 43/42.09 |
| 4,672,768 A * | 6/1987 | Pippert | | 43/42.09 |
| 4,689,914 A * | 9/1987 | Quinlan | | 43/42.26 |
| 4,691,929 A * | 9/1987 | Neumaier et al. | | 279/905 |
| 4,692,073 A * | 9/1987 | Martindell | | 279/82 |
| 4,697,378 A * | 10/1987 | Tunstall | | 43/42.09 |
| 4,736,542 A * | 4/1988 | Floyd | | 43/42.06 |
| 4,768,405 A * | 9/1988 | Nickipuck | | 403/325 |
| 4,777,757 A * | 10/1988 | de Marees van Swinderen | | 43/42.06 |
| 4,790,100 A * | 12/1988 | Green, Sr. | | 43/42.28 |
| 4,791,749 A | 12/1988 | Stazo | | |
| 4,831,768 A * | 5/1989 | Sorace | | 43/42.09 |
| 4,831,770 A * | 5/1989 | Dworski | | 43/42.28 |
| 4,858,939 A * | 8/1989 | Riggs | | 279/75 |
| 4,870,776 A | 10/1989 | Schock | | |
| 4,881,340 A * | 11/1989 | Davis | | 43/42.06 |
| 4,900,182 A * | 2/1990 | Stillwagon | | 403/322.2 |
| 5,018,297 A * | 5/1991 | Kennedy, Jr. | | 43/42.28 |
| 5,097,620 A * | 3/1992 | Nietupski | | 43/42.06 |
| 5,113,607 A * | 5/1992 | Pate | | 43/42.28 |
| 5,142,811 A * | 9/1992 | Freeman | | 43/42.06 |
| 5,155,948 A * | 10/1992 | Kitagawa | | 43/42.28 |
| 5,167,089 A * | 12/1992 | Schriefer | | 43/42.28 |
| 5,172,510 A * | 12/1992 | Lovell, Jr. | | 43/42.06 |
| 5,182,876 A * | 2/1993 | Lewis | | 43/42.09 |
| 5,197,220 A * | 3/1993 | Gibbs et al. | | 43/42.09 |
| D335,167 S | 4/1993 | Miller | | |
| 5,207,016 A * | 5/1993 | Pate | | 43/42.28 |
| 5,261,181 A * | 11/1993 | Melton | | 43/42.06 |
| 5,265,970 A * | 11/1993 | LaBarre | | 403/322.2 |
| 5,276,992 A * | 1/1994 | Kato | | 43/42.06 |
| 5,331,762 A * | 7/1994 | Banks | | 43/42.09 |
| 5,352,074 A * | 10/1994 | Ishikawa | | 279/75 |
| 5,361,531 A * | 11/1994 | Rodrigues | | 43/42.09 |
| 5,369,906 A * | 12/1994 | Anterni | | 43/42.09 |
| 5,381,620 A * | 1/1995 | Gibbs | | 43/42.09 |
| 5,398,946 A * | 3/1995 | Quiring | | 279/75 |
| 5,471,780 A * | 12/1995 | Hopson | | 43/42.06 |
| 5,533,296 A * | 7/1996 | Jansen | | 43/42.36 |
| 5,586,847 A * | 12/1996 | Mattern et al. | | 279/75 |
| 5,630,289 A * | 5/1997 | Dotson | | 43/42.09 |
| 5,709,047 A * | 1/1998 | Link | | 43/42.28 |
| 5,815,978 A * | 10/1998 | Huddleston | | 43/42.09 |
| 5,911,571 A * | 6/1999 | Wittbrot, III | | 43/42.09 |
| 5,934,007 A | 8/1999 | Ellestad | | |
| 5,934,384 A * | 8/1999 | Wang | | 279/75 |
| 5,950,348 A * | 9/1999 | Gruel | | 43/42.49 |
| 5,992,083 A * | 11/1999 | Deng et al. | | 43/42.09 |
| 5,996,452 A * | 12/1999 | Chiang | | 279/75 |
| 6,131,329 A | 10/2000 | Kageyama | | |
| 6,164,006 A * | 12/2000 | Peterson | | 43/42.09 |
| 6,199,872 B1 * | 3/2001 | Hasan | | 279/75 |
| 6,226,917 B1 * | 5/2001 | Sylla et al. | | 43/42.09 |
| 6,233,863 B1 * | 5/2001 | Dotson | | 43/42.09 |
| 6,327,808 B1 * | 12/2001 | Zascavage | | 43/42.09 |
| 6,357,167 B1 * | 3/2002 | Bradford | | 43/42.09 |
| D461,218 S | 8/2002 | Bambacigno | | |
| D467,297 S | 12/2002 | Tighe | | |
| 6,543,959 B1 * | 4/2003 | Jore | | 403/322.2 |
| 6,598,336 B2 * | 7/2003 | Link | | 43/42.28 |
| 6,640,487 B2 * | 11/2003 | Angwin | | 43/43.12 |
| 6,668,482 B1 * | 12/2003 | Ruffin et al. | | 43/42.06 |
| 6,836,997 B2 * | 1/2005 | Cramsey | | 43/42.06 |
| 6,898,894 B1 * | 5/2005 | Anderson | | 43/44.81 |
| 6,922,938 B1 * | 8/2005 | Ciuffo | | 43/42.28 |
| 7,013,765 B2 * | 3/2006 | Chang | | 403/325 |
| 7,036,264 B2 * | 5/2006 | Barbary | | 43/42.06 |
| 7,107,719 B1 * | 9/2006 | Scott | | 43/42.09 |
| 7,114,280 B2 * | 10/2006 | Turner | | 43/42.06 |
| 7,316,529 B2 * | 1/2008 | Phillips et al. | | 408/240 |
| 7,387,054 B2 * | 6/2008 | Rajotte | | 279/75 |
| 8,028,464 B2 * | 10/2011 | Smith et al. | | 43/42.09 |
| 8,091,271 B2 * | 1/2012 | Mayer | | 43/42.09 |
| 2001/0042964 A1* | 11/2001 | Bedi et al. | | 279/75 |
| 2003/0143021 A1* | 7/2003 | Whalen | | 403/322.2 |
| 2004/0164503 A1* | 8/2004 | Fan-Chiang et al. | | 279/75 |
| 2004/0188959 A1* | 9/2004 | Chen | | 279/82 |
| 2005/0116429 A1* | 6/2005 | Chang | | 279/75 |
| 2005/0217165 A1* | 10/2005 | Anderson | | 43/42.09 |
| 2006/0032109 A1* | 2/2006 | Chiodo | | 43/42.09 |
| 2006/0042147 A1* | 3/2006 | Jenkins | | 43/42.09 |
| 2006/0049587 A1* | 3/2006 | Cornwell | | 279/75 |
| 2006/0097464 A1* | 5/2006 | Strauch et al. | | 279/75 |
| 2006/0145431 A1* | 7/2006 | Chang | | 279/74 |
| 2006/0163823 A1* | 7/2006 | Shu | | 279/75 |

| | | | |
|---|---|---|---|
| 2006/0181033 A1* | 8/2006 | Chen ............................. 279/75 |
| 2006/0236588 A1* | 10/2006 | Rapelje ....................... 43/42.09 |
| 2008/0066368 A1* | 3/2008 | Ciotlos ........................ 43/42.09 |
| 2008/0104877 A1* | 5/2008 | Claverie ...................... 43/42.09 |
| 2008/0222939 A1* | 9/2008 | Smith et al. ................. 43/42.09 |
| 2011/0185622 A1* | 8/2011 | Somogyi ...................... 43/42.06 |

FOREIGN PATENT DOCUMENTS

| GB | 2347171 A | * | 8/2000 |
| JP | 2001182726 A | * | 7/2001 |
| JP | 2006090401 A | * | 4/2006 |

* cited by examiner

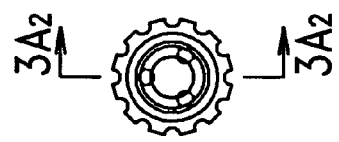
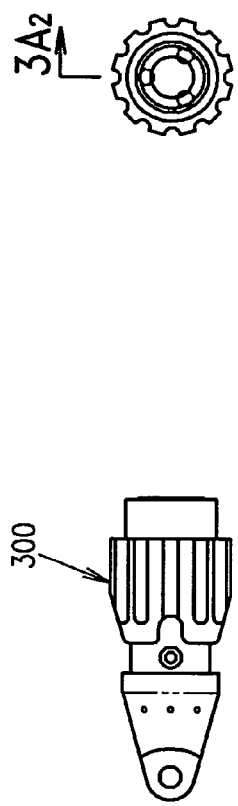
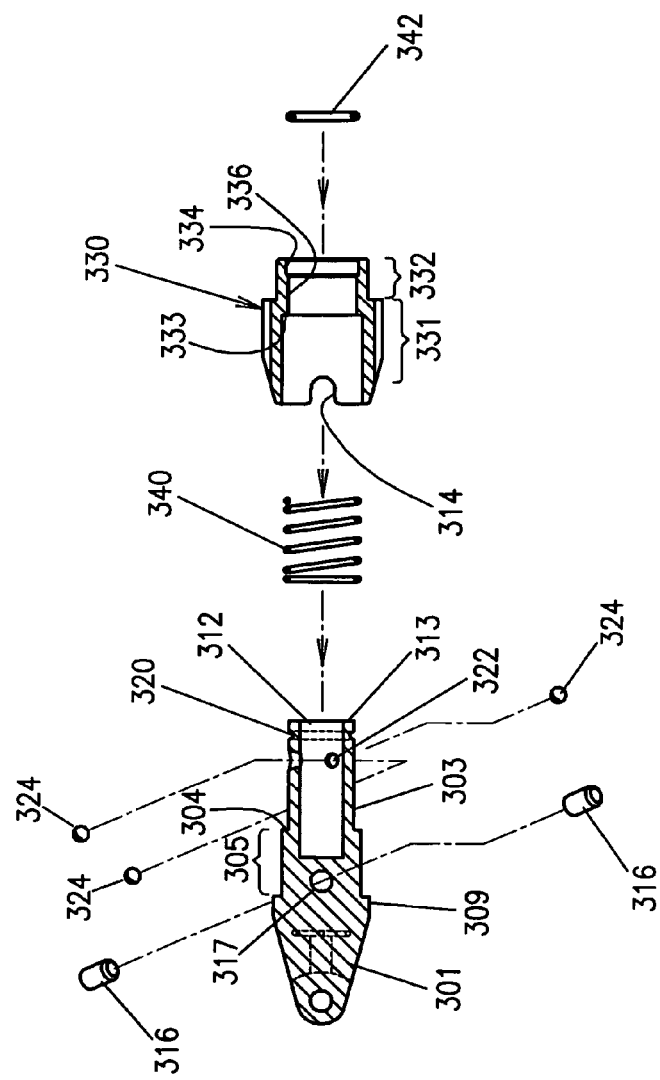

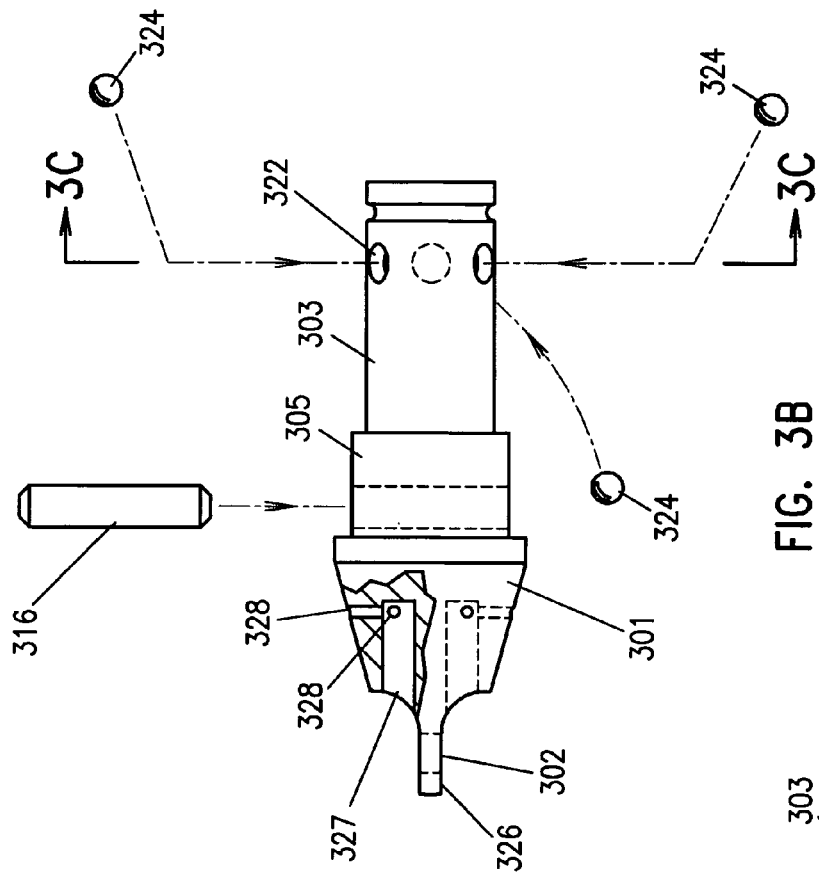
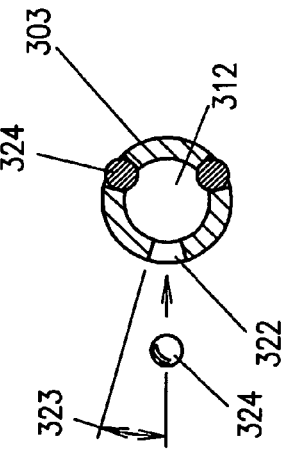
FIG. 3B
FIG. 3C

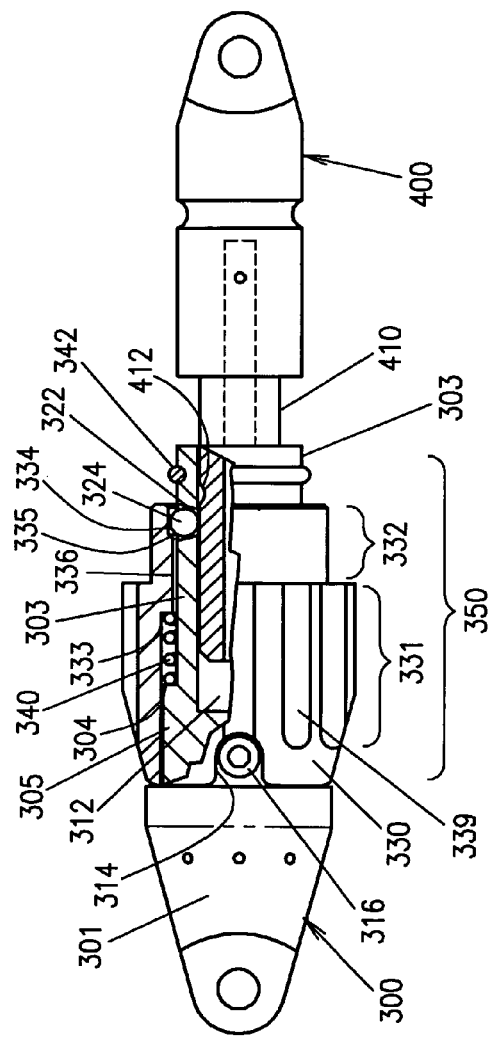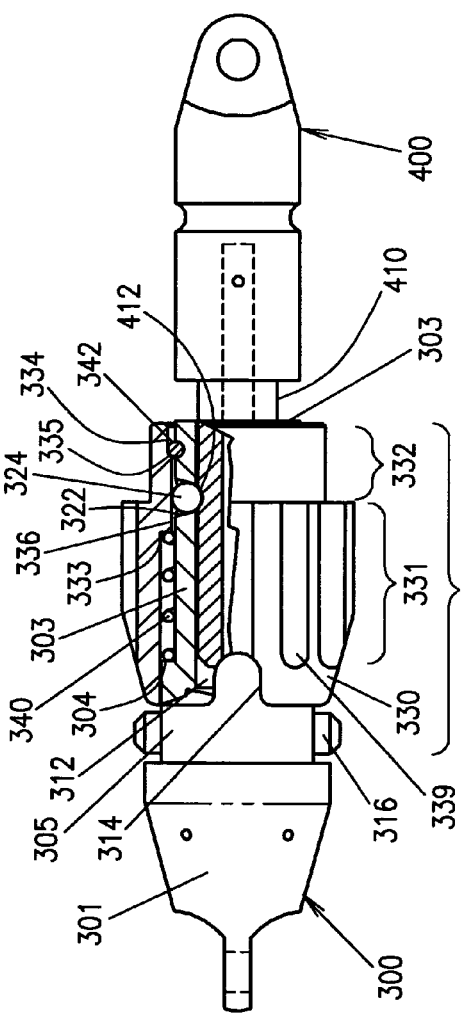

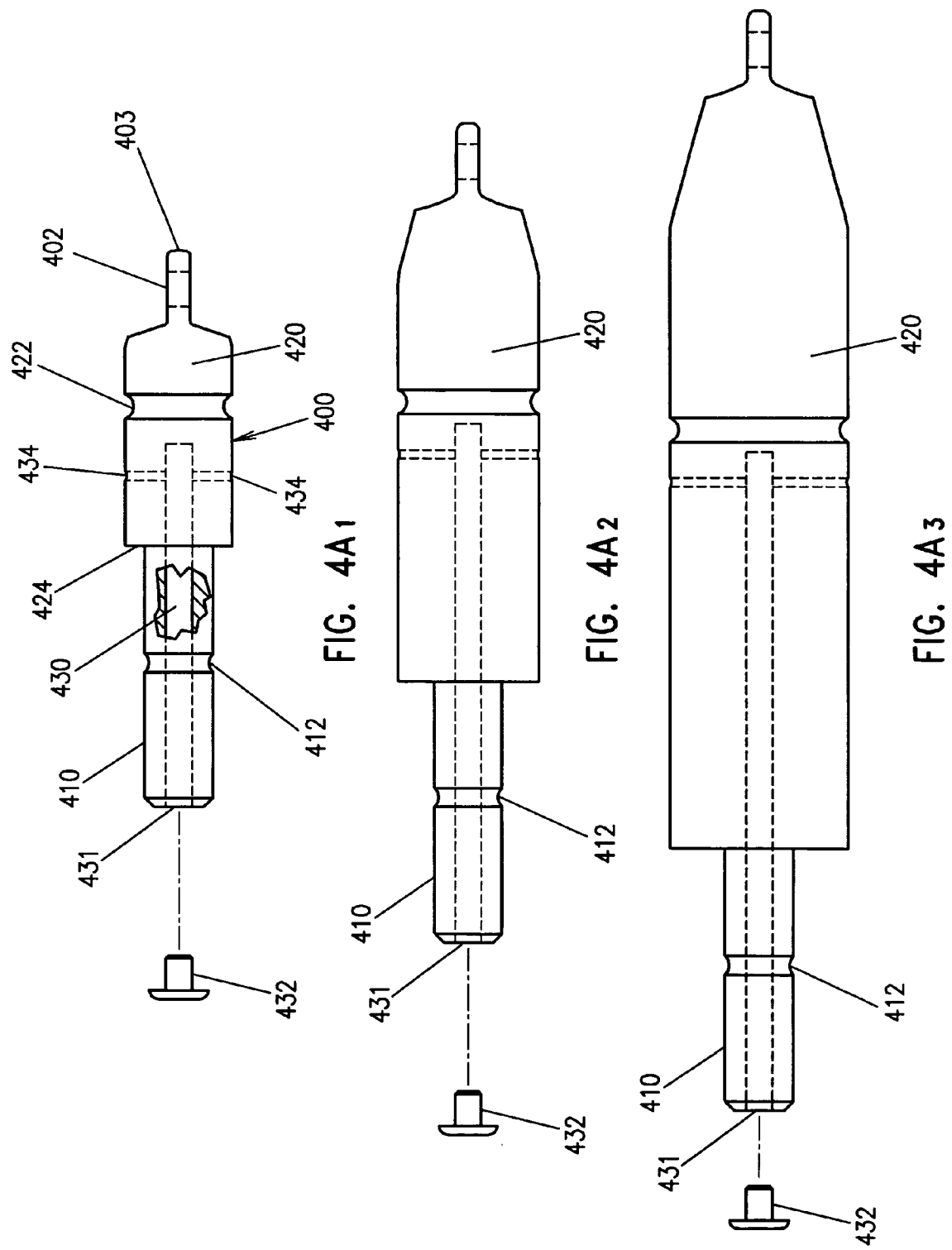
FIG. 4A₁  FIG. 4A₂  FIG. 4A₃

FOR CLARITY SHOWN ONE RIB ONLY
AND PORTION OF CHUTE FABRIC

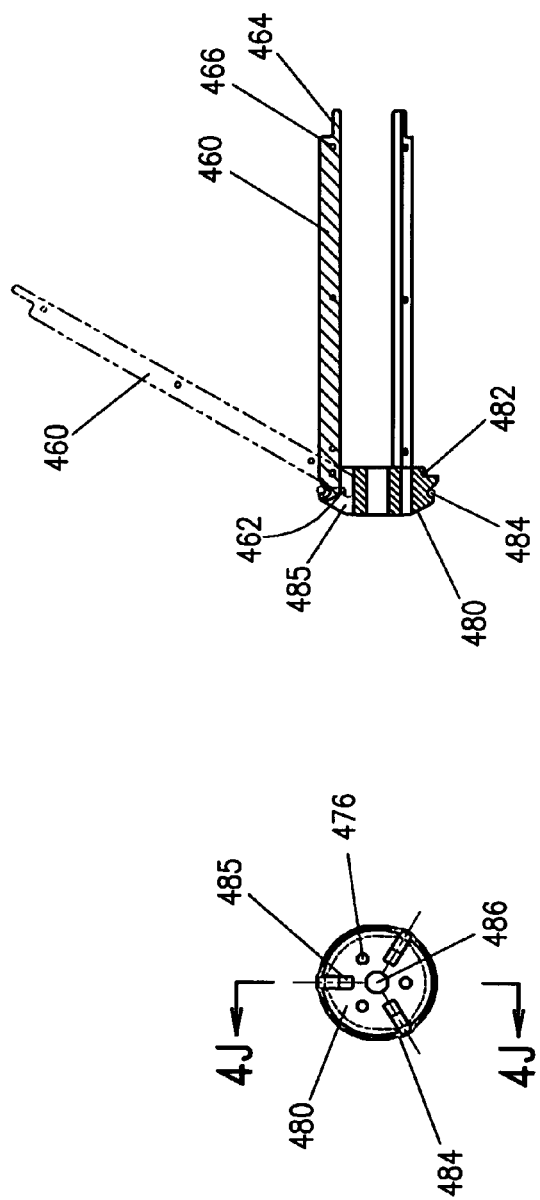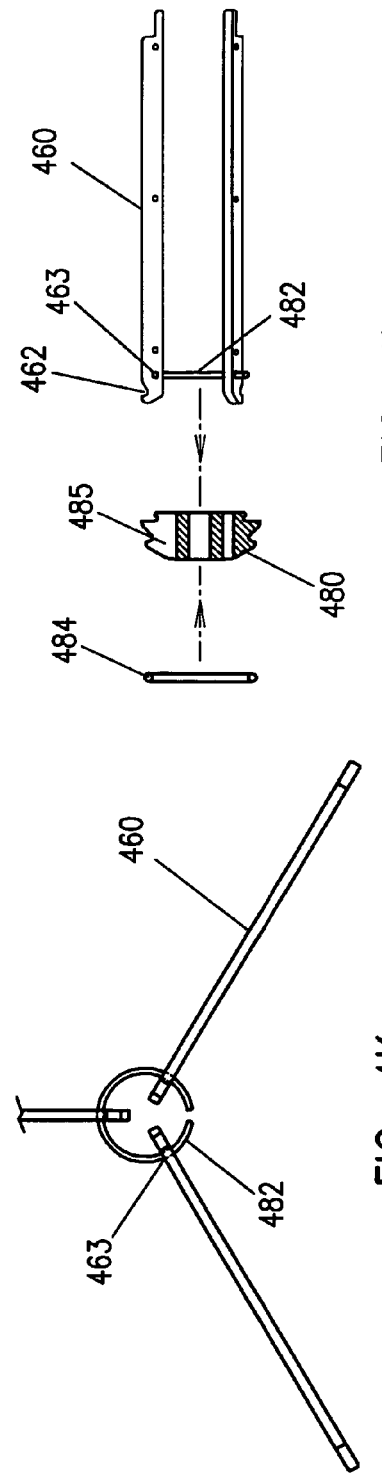
FIG. 4J
FIG. 4L
FIG. 4K
FIG. 4H

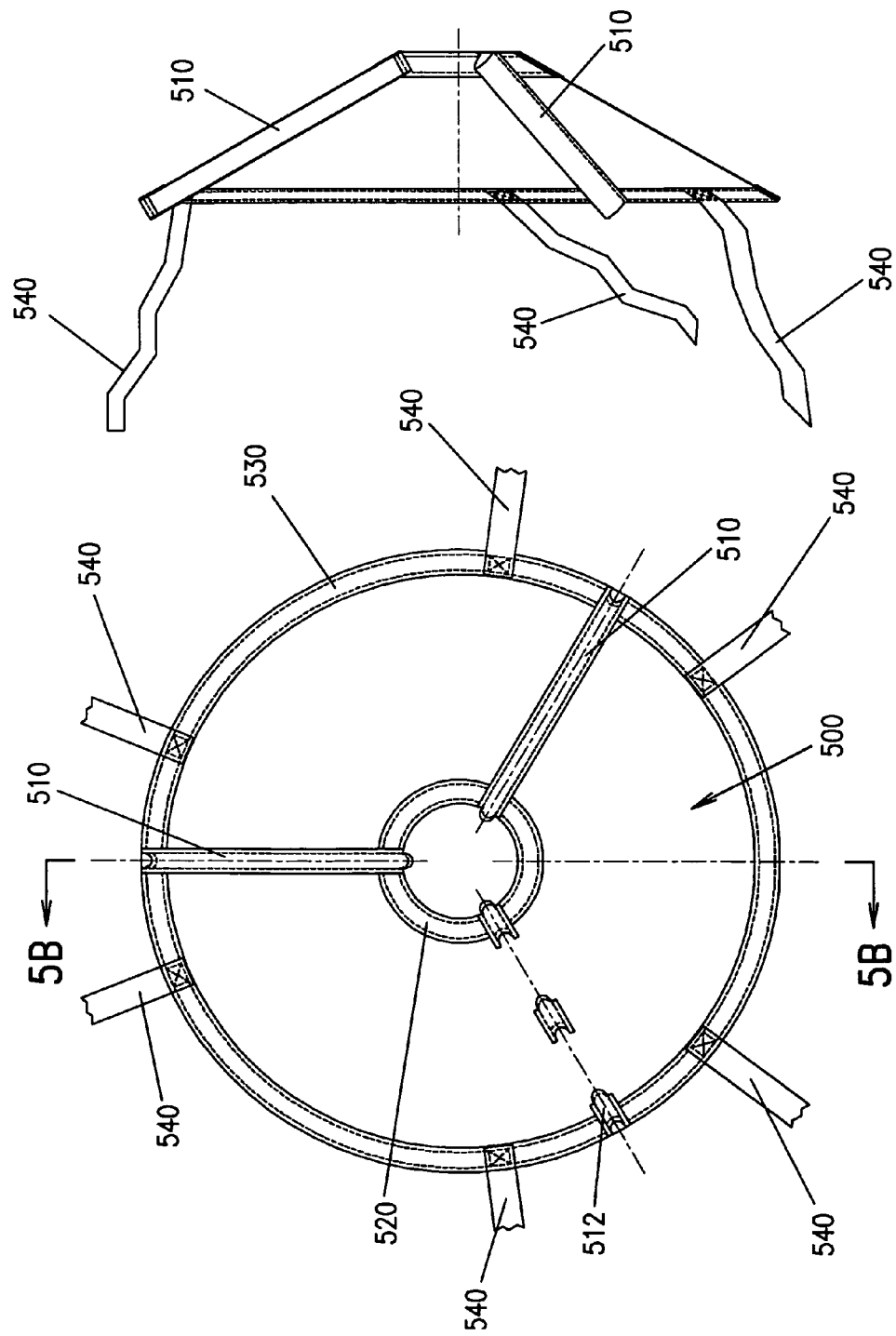

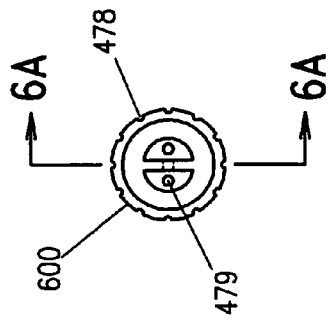
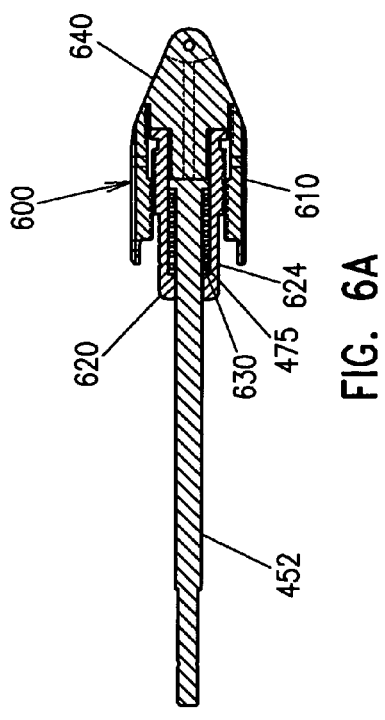
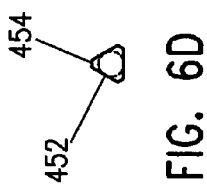
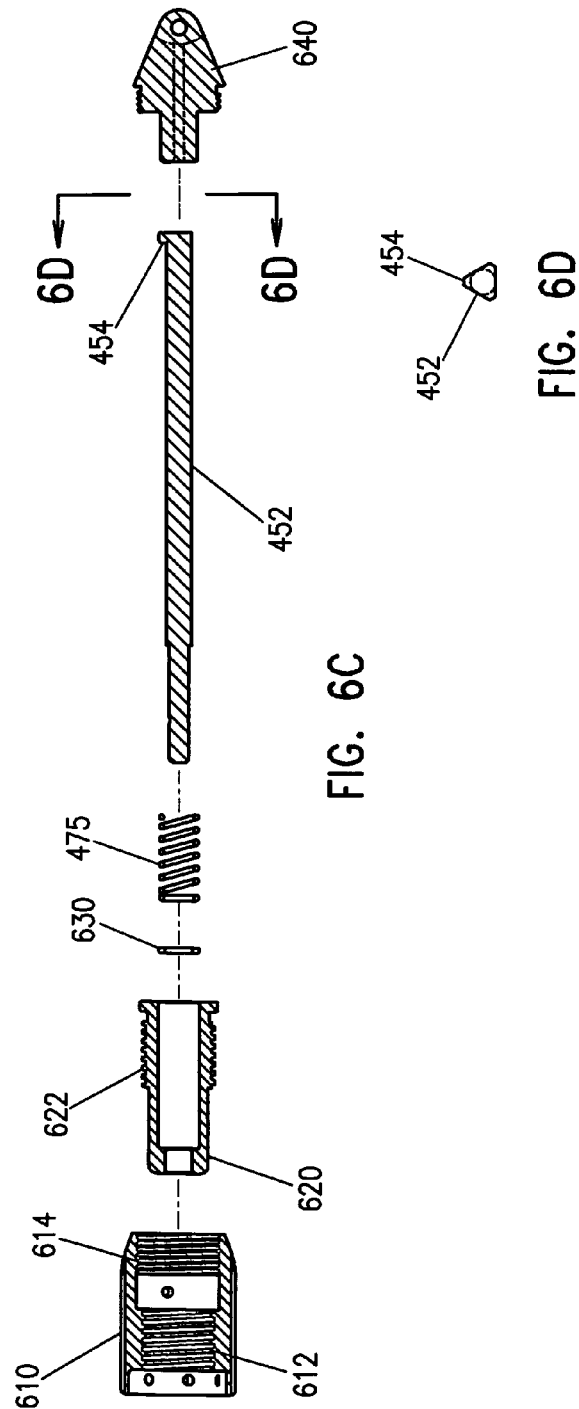

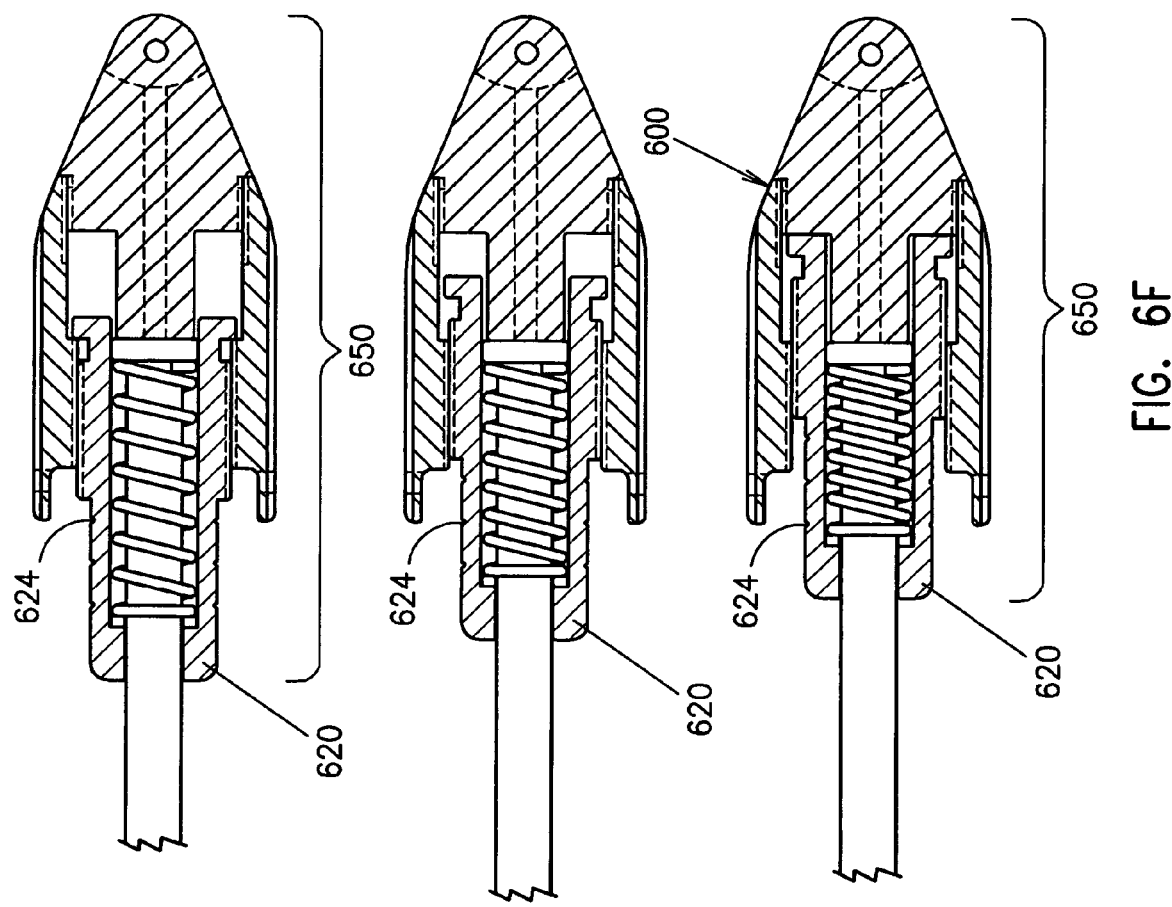

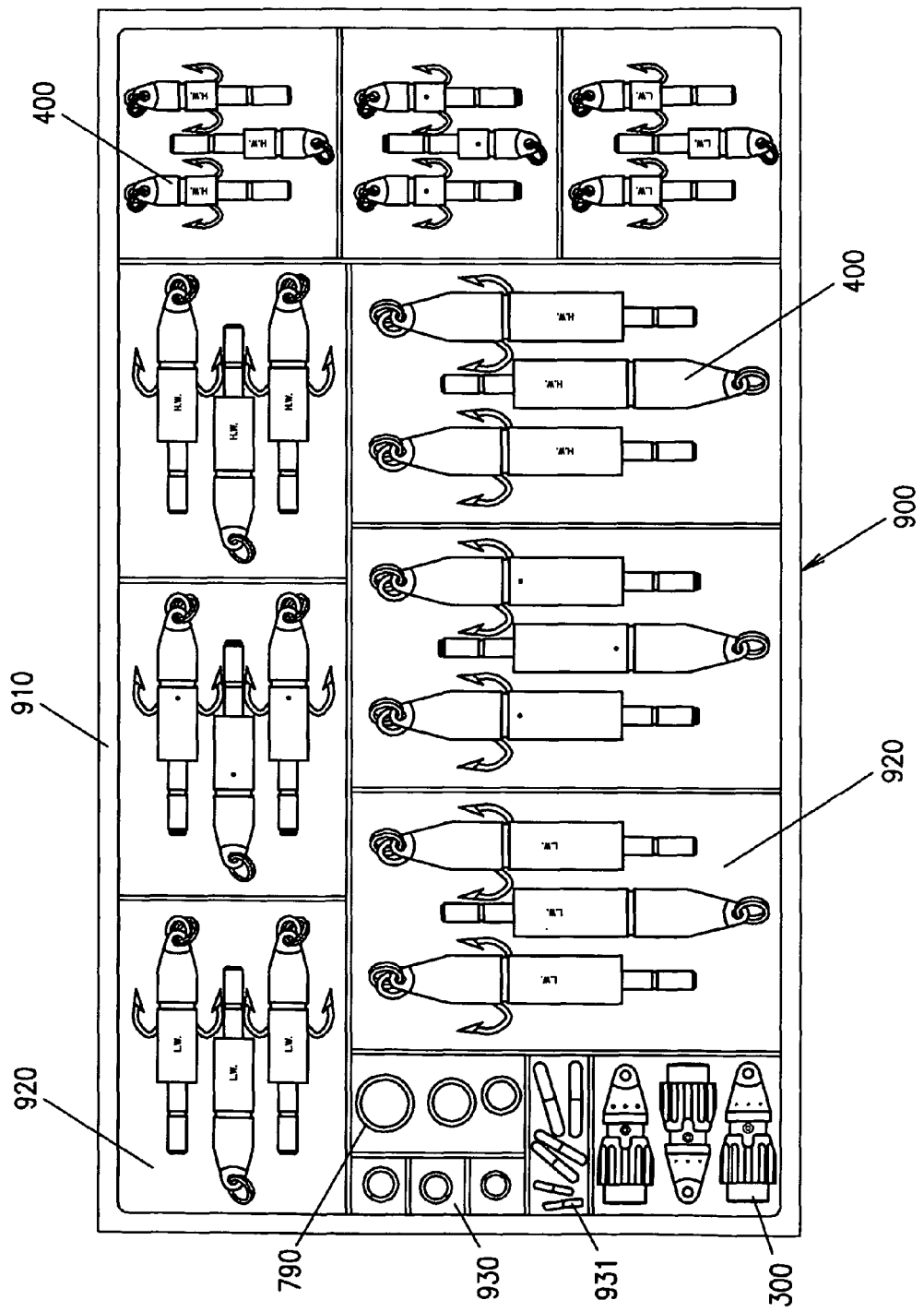

FISHING LURE AND KIT

CROSS-REFERENCE TO RELATED APPLICATIONS

This application claims priority from U.S. Provisional Patent Application No. 60/591,249, filed Jul. 26, 2004, entitled Fishing Lure and Kit, to inventor Andrew Zuk, the contents of which are incorporated by reference herein in their entirety.

FIELD OF THE INVENTION

1. Field

Embodiments relate to the field of sporting equipment, and in particular, fishing lures.

2. Related Art

FIG. 1A is a plan view of a typical fishing lure. Lure 100 includes body 110, from which lead line 112 extends. Lure 100 also includes hook 130. In some cases, body 110 is provided with fish-like features, for example eyes 118 or stripes 119. Lead line 112 is typically tied to swivel 120, to which line 122 is tied, with knot 124.

FIG. 1B is a plan view of a typical fishing lure. In some fishing lures, body 110 of lure 140 is encased in skirt 150, which includes tentacles 152. Lure 140 is typically equipped with a line, shown as lead line 112, or swivel 120 at one end and hook 130 at another.

FIG. 1C is a plan view of a typical fishing lure. Some fishing lures are formed of a flat body 160, to which stripes 119 may be added. Such lures are typically equipped with ring 116 at either end. Hook 130 is typically attached to ring 116.

One problem with typical fishing lures is that lines 112, 122 are permanently attached to body 110, or tied with knots 124 to ring 116. When a fish is caught, and brought on a boat, the hooks must be extracted, or sometimes the lines are cut, in order to attach new lures and hooks. Reattaching lines and unhooking fish are time-consuming processes that waste time during the important interval while fish are hitting.

Another problem with typical fishing lures is that it is desirable to change lures to ones of different shape, color, pattern, weight, depth or other features quickly, while fish are hitting other lines. Lures that are tied on need to be cut, and new lures re-tied, thus consuming valuable time. Also, because the design or function of each lure is a permanent part of the lure body, it can be necessary to purchase and carry a large collection of complete lures, expending money and being burdensome.

It is therefore desirable to have a lure which is easily removed and replaced on a line, and which can be reconfigured to perform many different functions and to have many different appearances, masses, and/or accessories.

SUMMARY

Embodiments include a fishing lure, having a head member with a quick-release mechanism to which a removable tail member attaches.

Embodiments further include different skirts that are capable of attachment to a removable tail member. Some skirts are formed tightly around a body and some skirts resemble tentacles.

Embodiments include a tail that is capable of releasing a drag chute when struck by a fish, capable of slowing the progress of a running fish, while facilitating reeling-in the fish.

Embodiments include dive wings, fastened to removable tails, capable of causing a lure to achieve a desired depth when pulled through water.

Embodiments for example those fashioned of 6061 aluminum and/or stainless steel, are environmentally sound, durable, and corrosion resistant.

Embodiments include a kit, comprising one or more heads with quick releases, tails, and skirts. In a "Swift Cast" lure system, lures can have adjustable weight, adjustable trolling and retrieving depth, exchangeable colors, and/or changeable form (physical size, shape and texture). Lures can also include built-in advanced swivels, built in controllable liquid chum (bait) delivery system, built in jets, built in turbulence inducing fins, and/or glowing capacity.

Various embodiments facilitate effective and efficient fishing in numerous applications (e.g., trolling, jogging, casting, sliding, bottom bouncing), and are capable of working in different rigging configurations (e.g., arm lure, teaser). Removable tails save time by providing quick disconnect and reconnect, only requiring seconds to change weight, color, form, and/or function on a single line, thus increasing fishing productivity. Space is saved because fewer units are required and many interchangeable components can be stored in one box. Consumers save money by replacing many single-use and/or single-function fishing devices with fewer components. Such lure kits are also versatile and fun for users; use being easily learned.

BRIEF DESCRIPTION OF THE ILLUSTRATIONS

FIGS. 1A, 1B, and 1C (prior art) are plan views of typical fishing lures and lines.

Figure 1A:
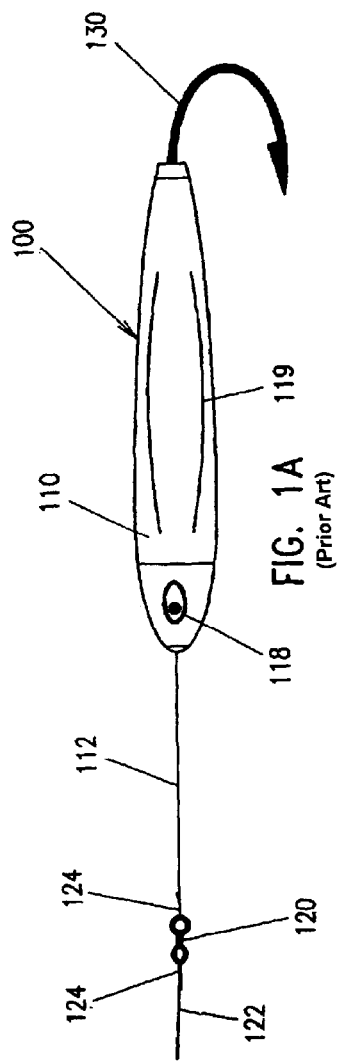
Figure 1B:
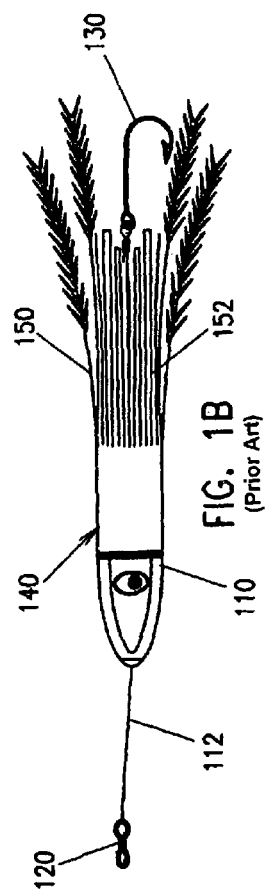
Figure 1C:
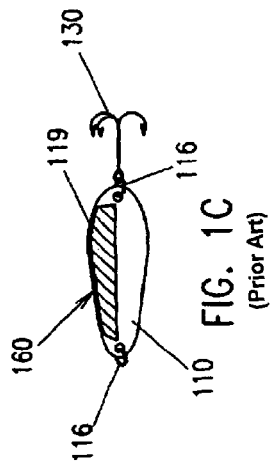

FIGS. 3A, 3A1, and 3A2 are sides end, and cut views of an embodiment of a lure head with a quick release mechanism, according to the present invention.

FIG. 3B is a plan view, from a rotated perspective, of an embodiment of a lure head core, according to the present invention.

FIG. 3C is a view along cut line 3C of an embodiment of a head core and bearings, according to the present invention.

FIG. 3D is a partial sectional view of an embodiment of a quick release mechanism, according to the present invention.

FIG. 3E is a partial sectional view of an embodiment of a locking mechanism, rotated 90 degrees from FIG. 3D, according to the present invention.

Figure 3F:
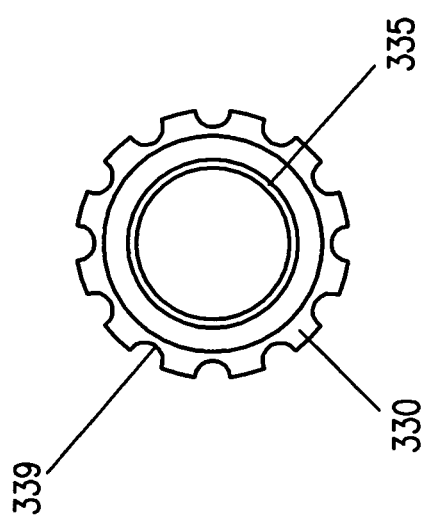

FIG. 3F is an end view of an embodiment of a slide, according to the present invention.

FIG. 4A1 is a plan view of an embodiment of a tail, according to the present invention.

FIGS. 4A2 and 4A3 are plan views of embodiments of tails, according to the present invention.

Figure 4B:
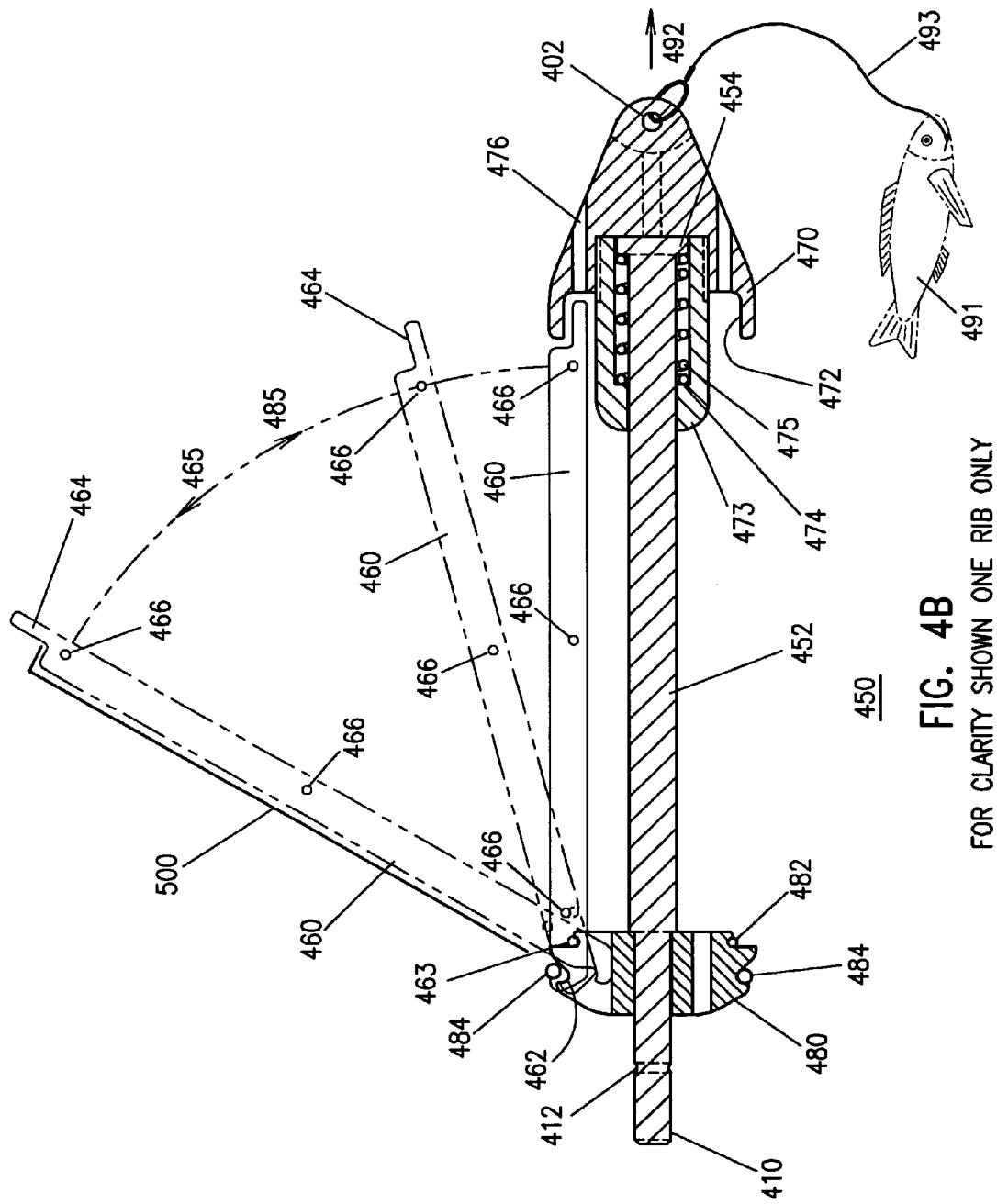

FIG. 4B is a plan view of an embodiment of a tail with a drag mechanism, according to the present invention.

Figure 4C:
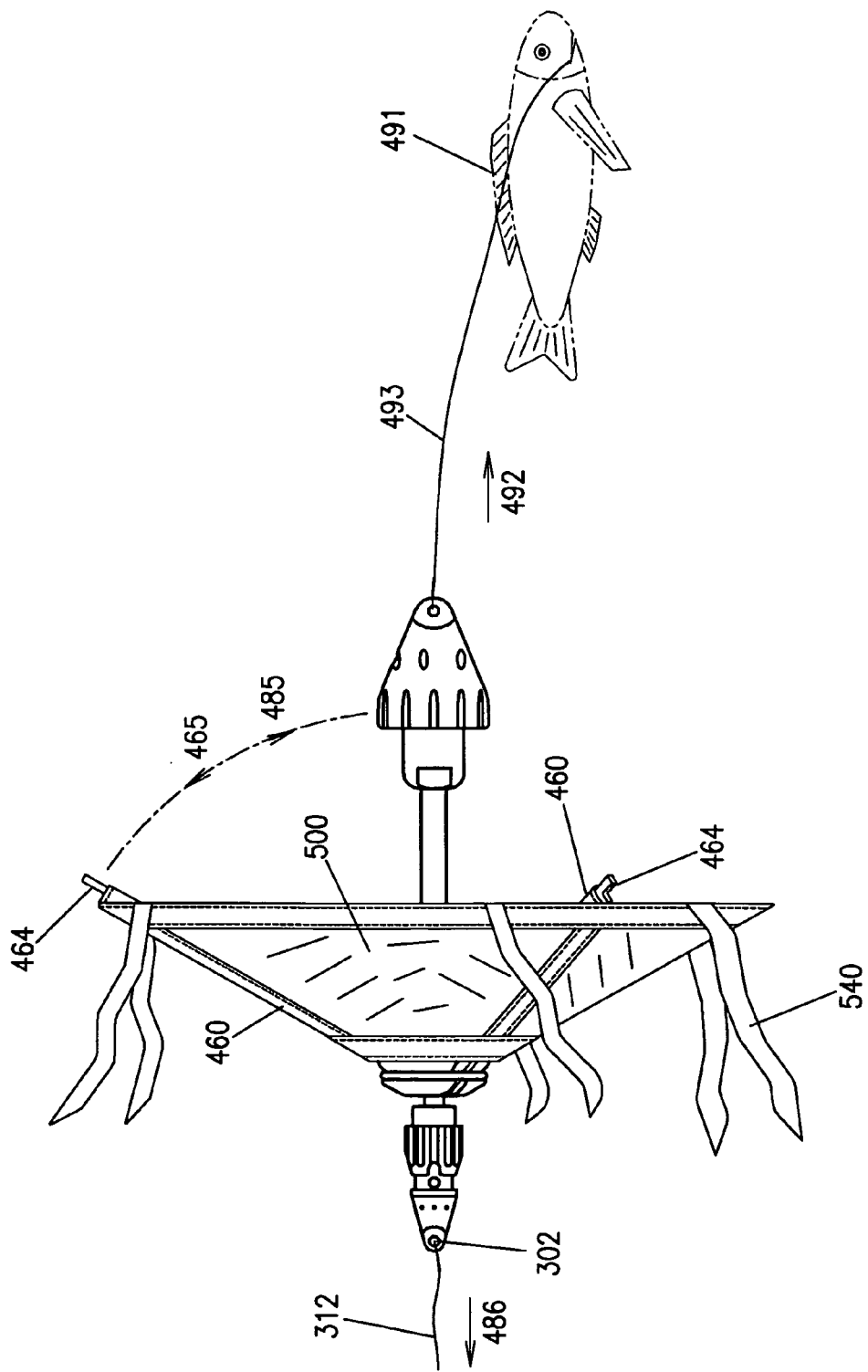
Figure 4D:
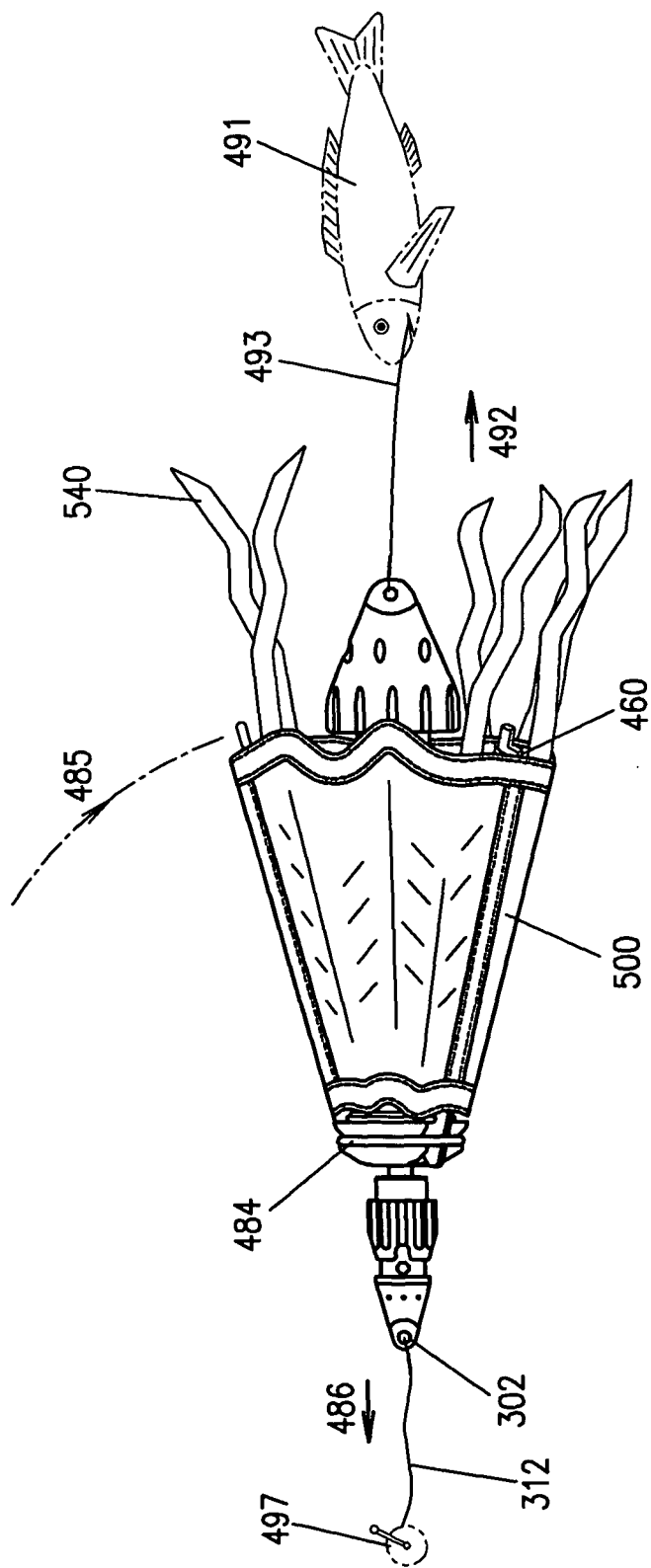

FIGS. 4C and 4D are plan views illustrating an embodiment of a drag chute in use.

Figure 4E:
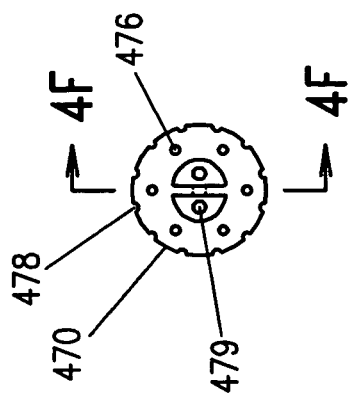

FIG. 4E is an end view of an embodiment of a locking mechanism, according to the present invention.

Figure 4F:
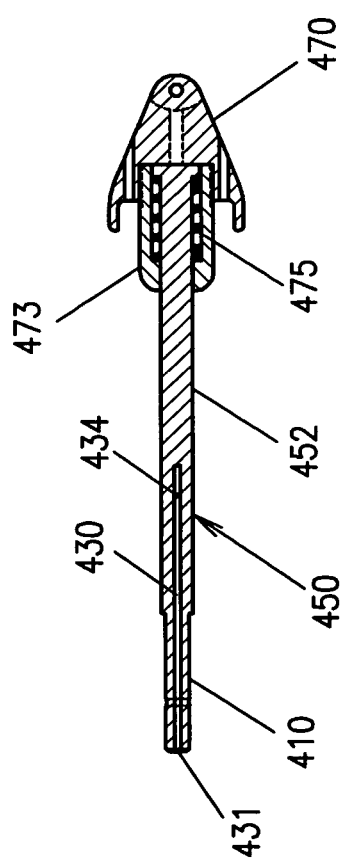

FIG. 4F is a cut view through an embodiment of a tail, according to the present invention.

Figure 4G:
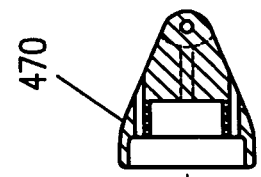
Figure 4G:
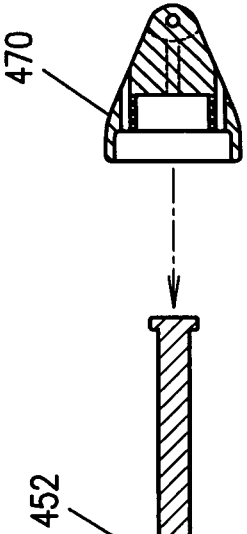
Figure 4G:
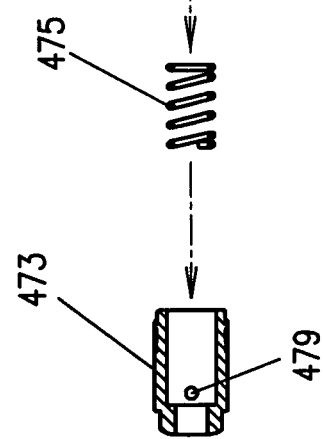

FIG. 4G is a partial assembly view of an embodiment of a tail drag chute mechanism, according to the present invention.

FIG. 4H is an end view of an embodiment of a crown, according to the present invention.

FIG. 4J is a cut view of an embodiment of a crown, according to the present invention.

FIGS. 4K and 4L are illustrative of an embodiment of a lure assembly method, according to the present invention.

FIG. 5A is an end view of an embodiment of a drag chute, according to the present invention.

FIG. 5B is a side view of an embodiment of a drag chute, according to the present invention.

Figure 5C:
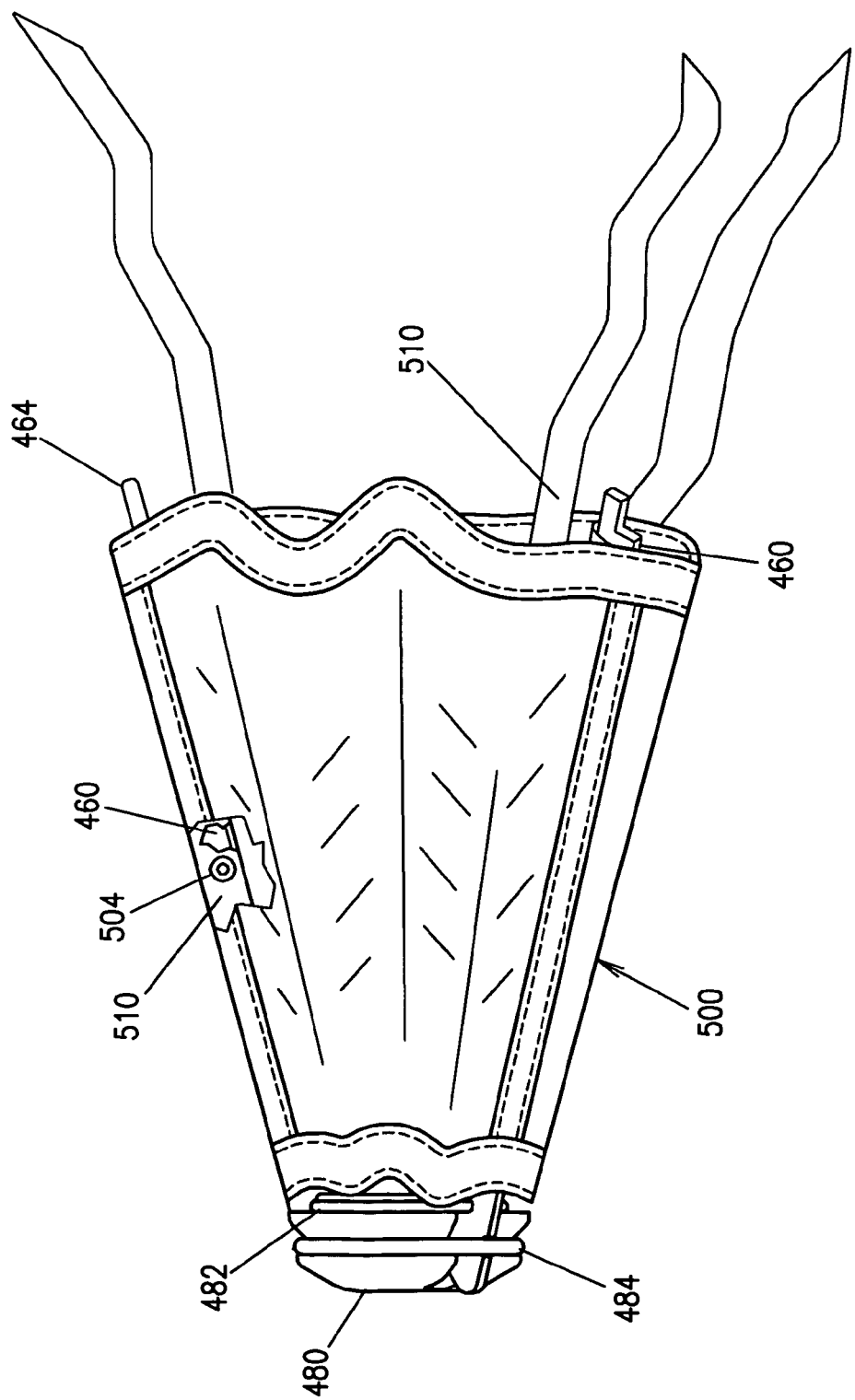

FIG. 5C shows an embodiment of a drag chute assembled on ribs and crown, according to the present invention.

FIG. 6A is a cut view of an embodiment of a drag chute release mechanism with adjustable release force, according to the present invention.

FIG. 6B is an end view of an embodiment of an adjustable release mechanism, according to the present invention.

FIG. 6C is an assembly view of an embodiment of an adjustable release mechanism, according to the present invention.

FIG. 6D is an end view of an embodiment of a tail body flange, according to the present invention.

Figure 6E:
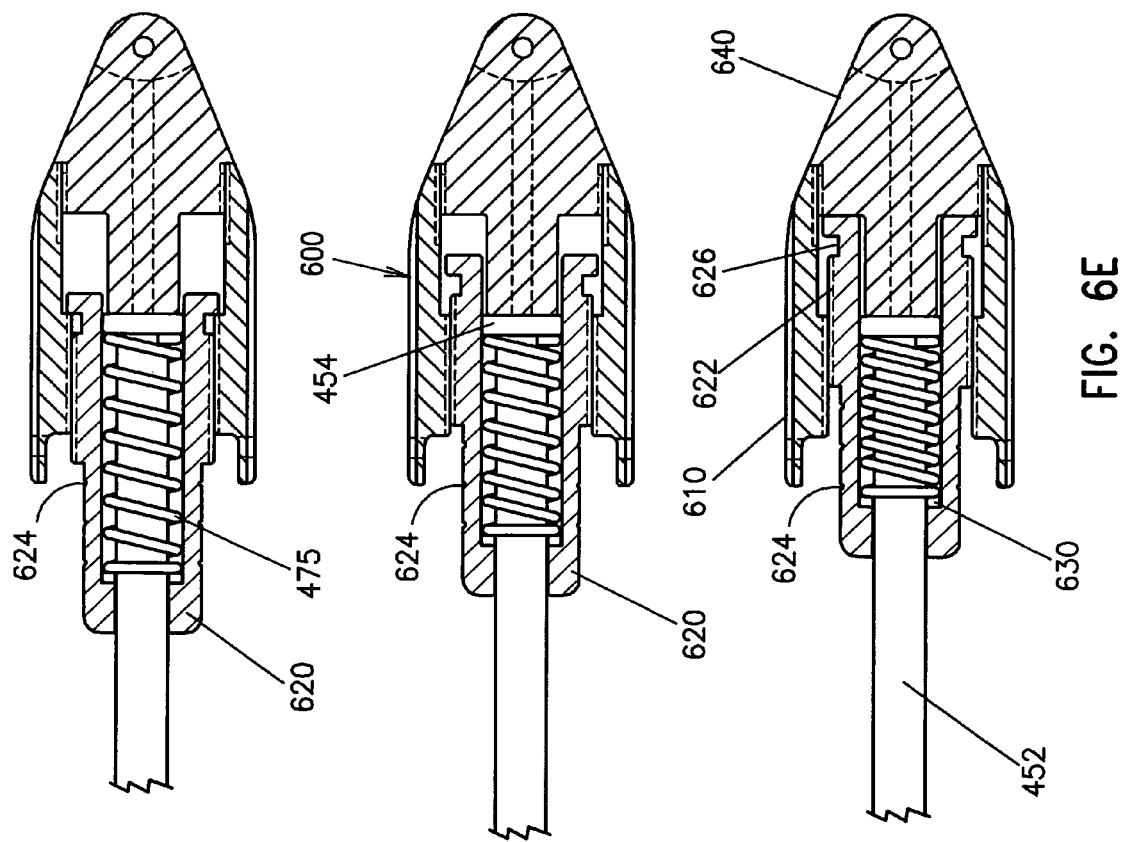

FIGS. 6E and 6F illustrate three tension settings of an example release mechanism, according to the present invention.

Figure 6G:
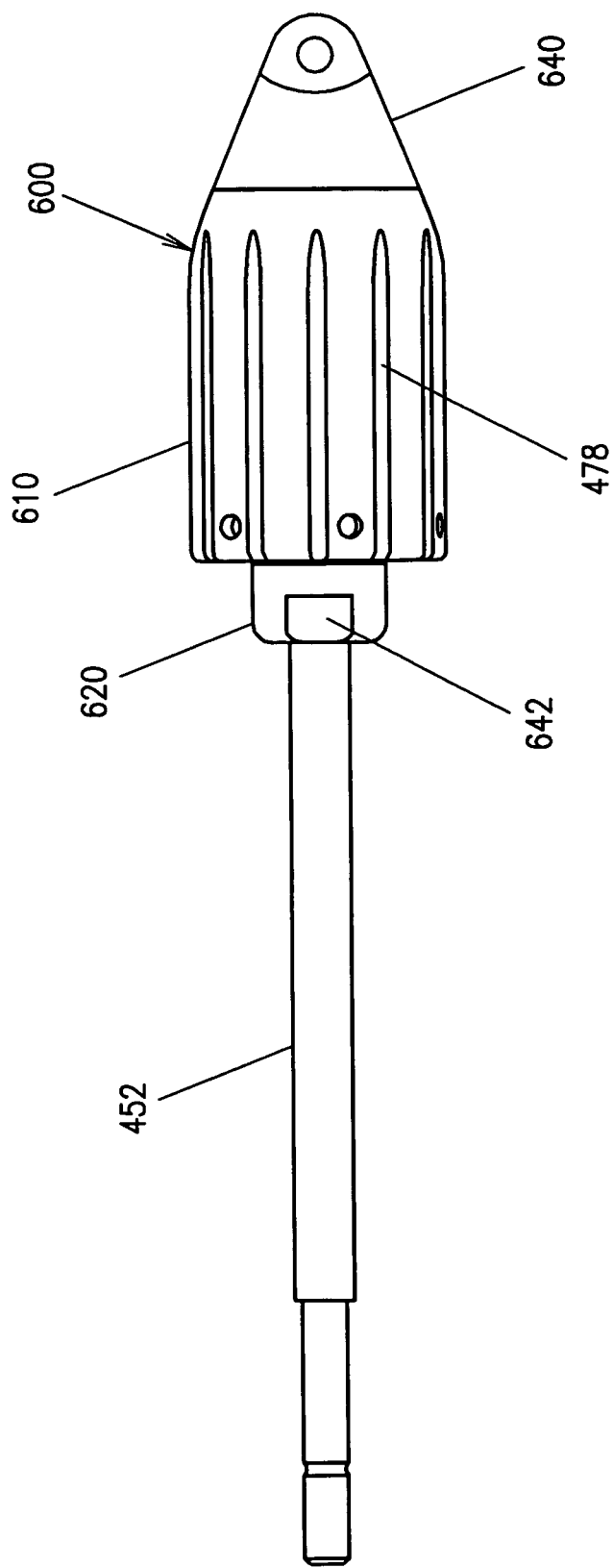

FIG. 6G is a side view of an embodiment of a release mechanism and tail body, according to the present invention.

Figure 7B:
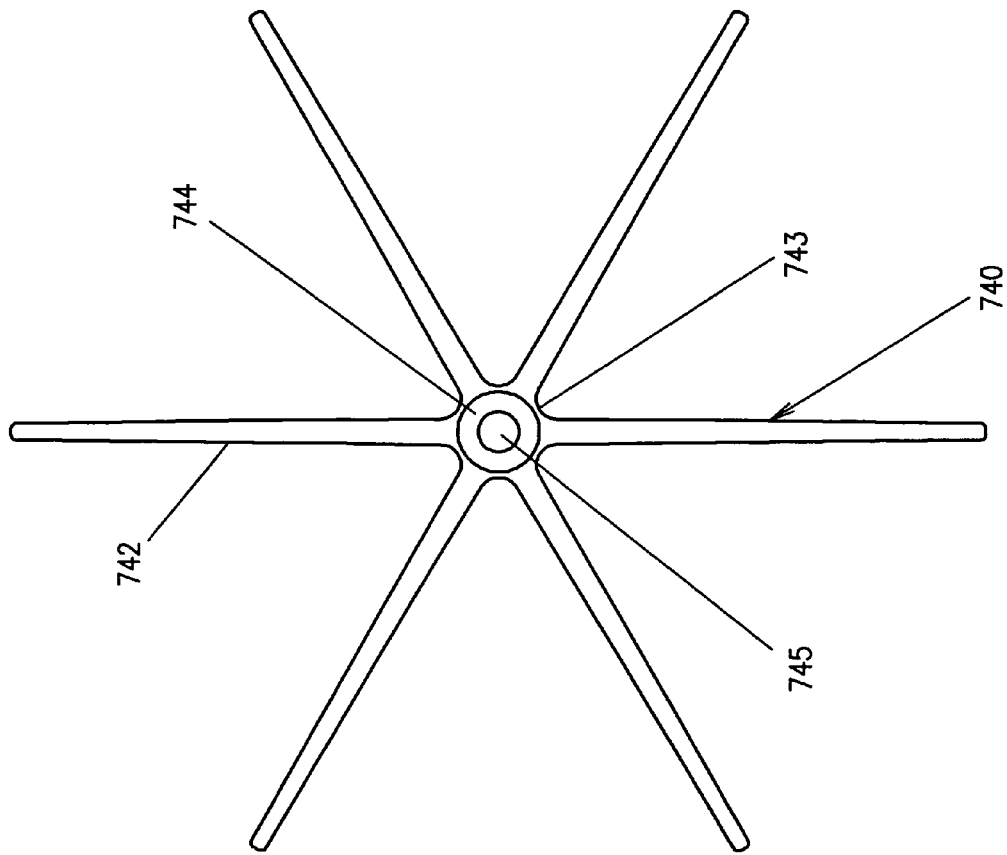
Figure 7A:
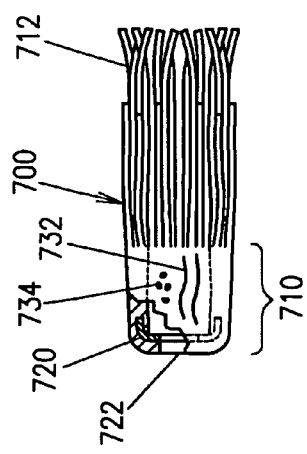

FIG. 7A is a plan view of an embodiment of a skirt, according to the present invention.

FIG. 7B is a plan view of a pattern for an embodiment of a tentacle skirt, according to the present invention.

Figure 7C:
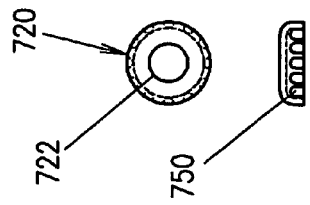

FIG. 7C is a diagram of an embodiment of a skirt ring, according to the present invention.

Figure 7D:
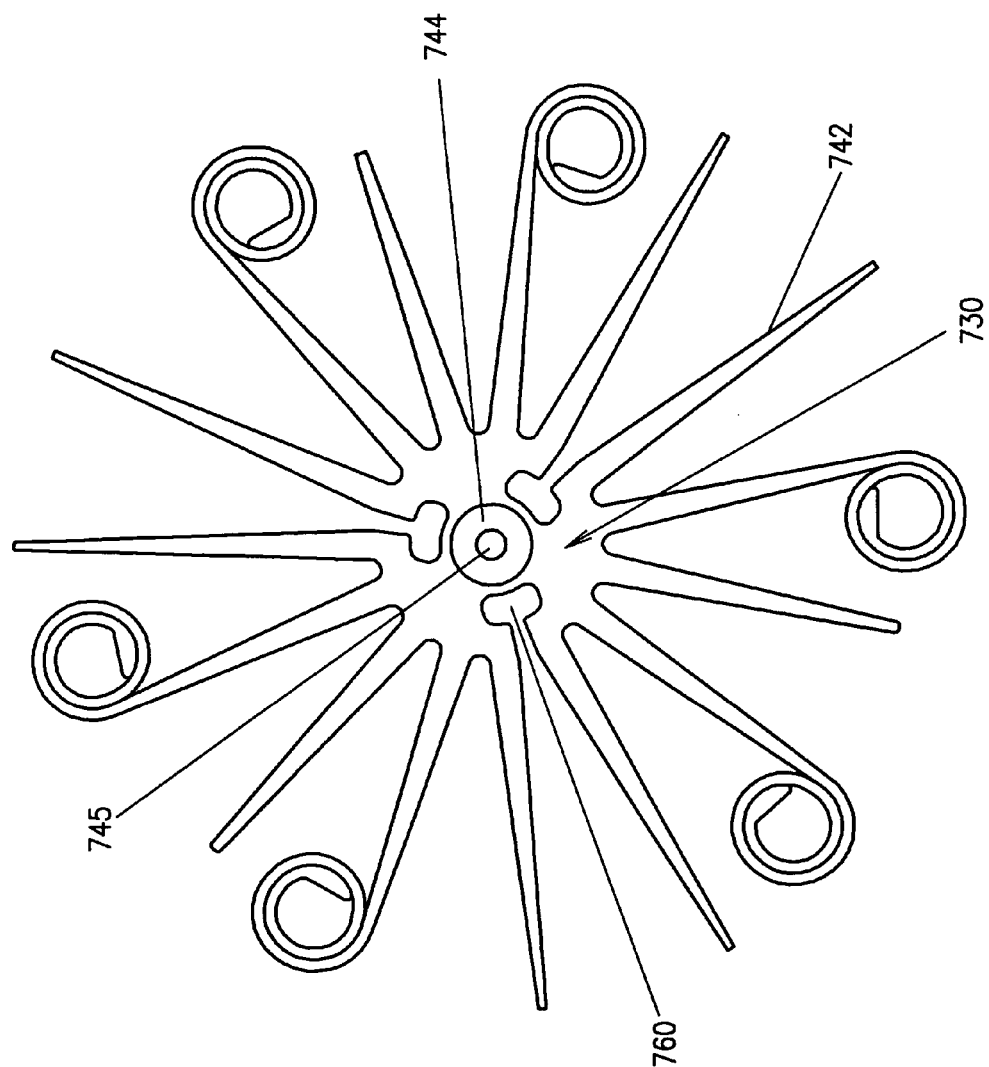

FIG. 7D is an embodiment of a skirt pattern, according to the present invention.

Figure 8B:
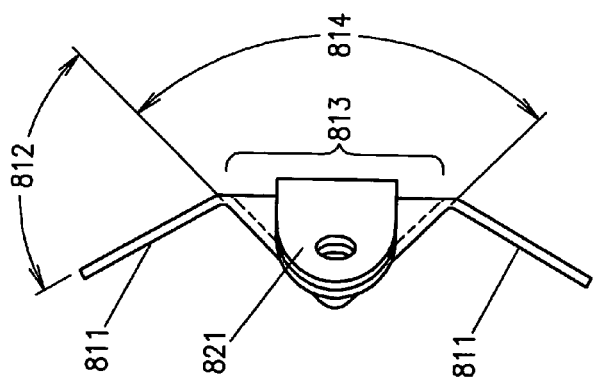
Figure 8A:
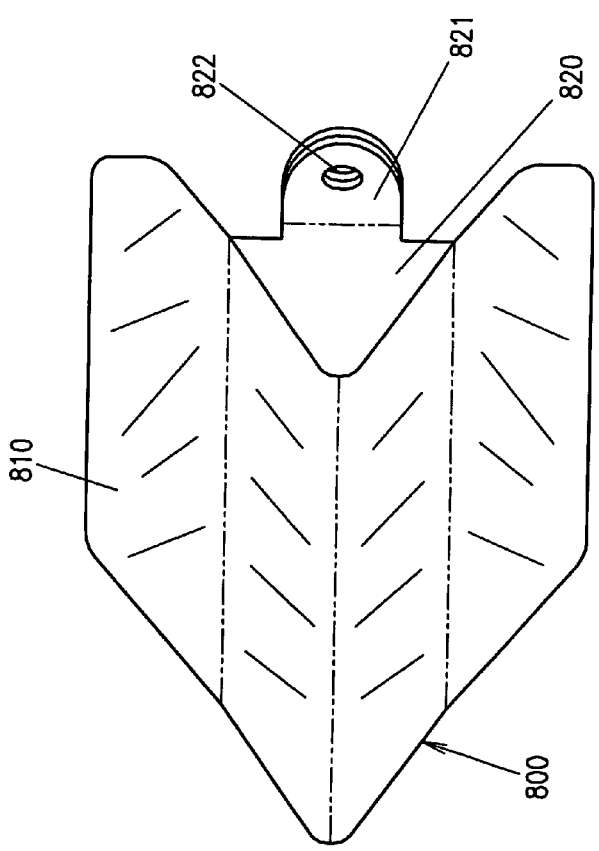

FIG. 8A is a top-view of an embodiment of a diving wing for a fishing lure, according to the present invention.

FIG. 8B is an end view of an embodiment of a diving wing for a fishing lure, according to the present invention.

Figure 8C:
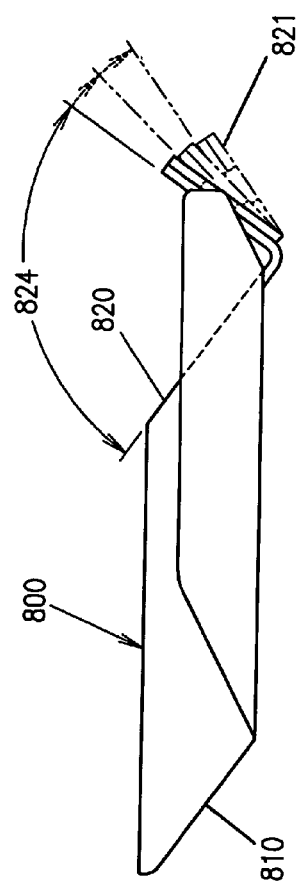

FIG. 8C is a plan view of an embodiment of a mounting structure for a diving wing for a fishing lure, according to the present invention.

Figure 8D:
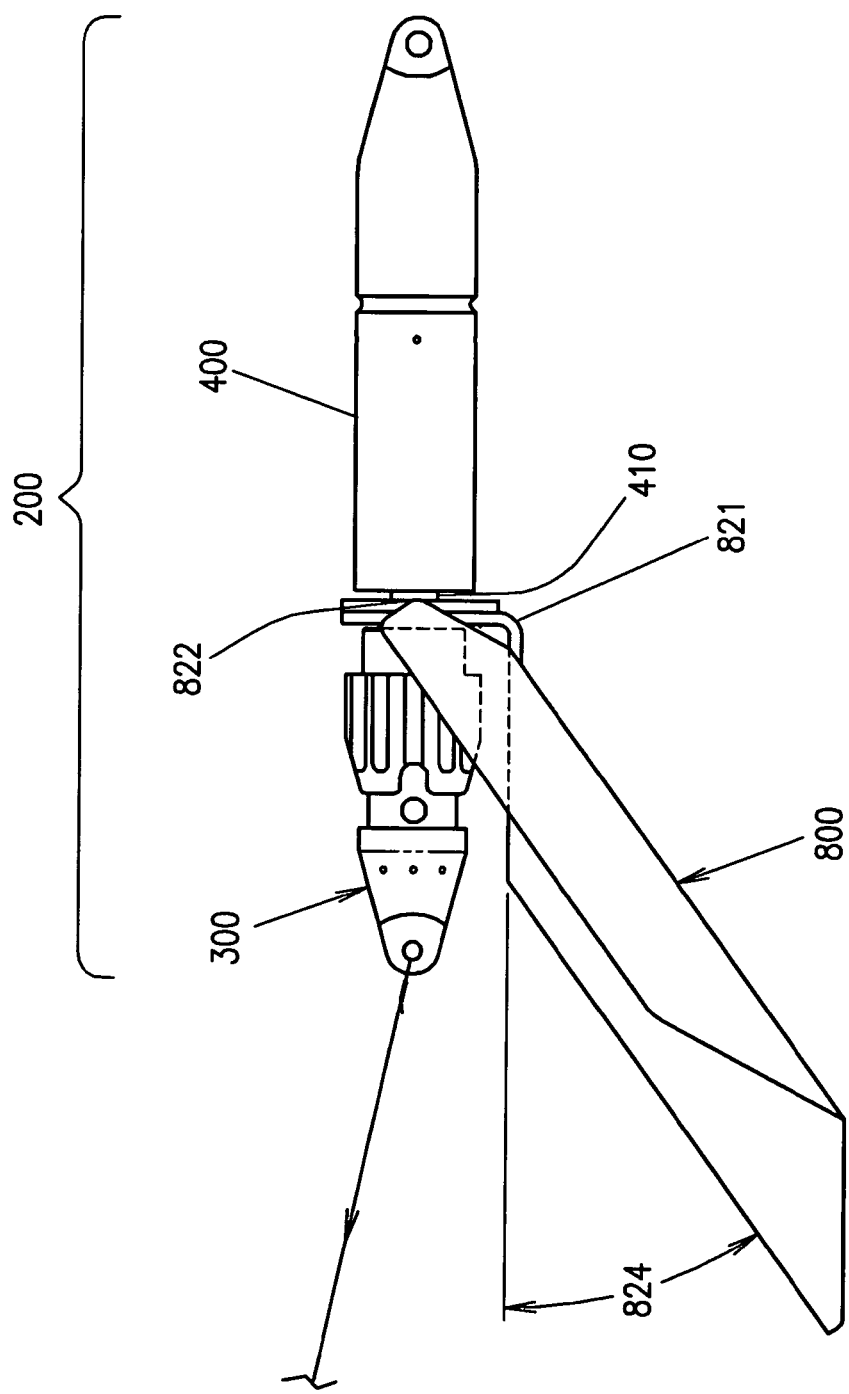

FIG. 8D is a side view of an embodiment of a diving wing attached to a lure, according to the present invention.

Figure 8E:
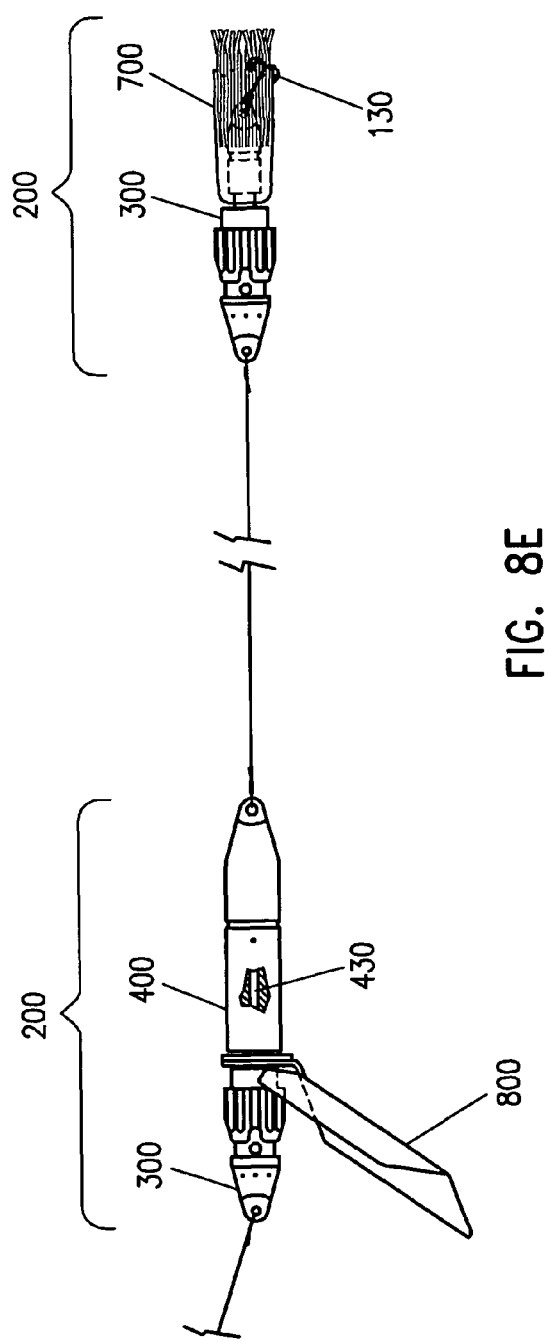

FIG. 8E is a side view of an embodiment of a lure with a diving wing and a teaser, according to the present invention.

Figure 8F:
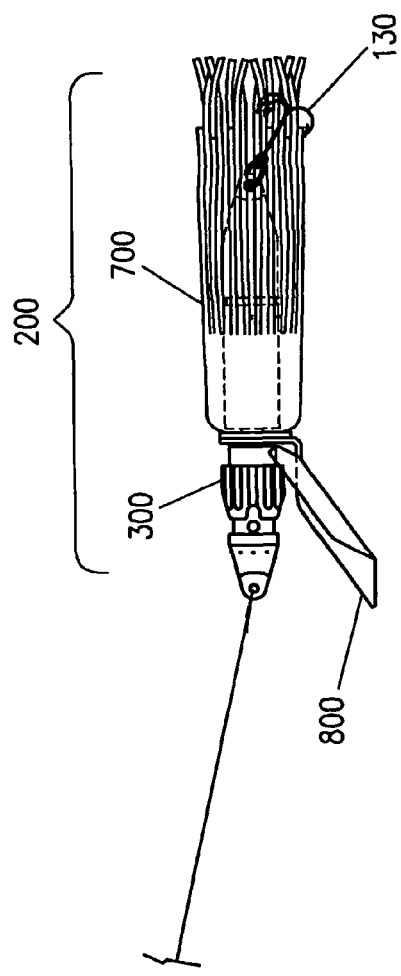

FIG. 8F is a side view of an embodiment of a lure with a diving wing, skirt, and hook, according to the present invention.

FIGS. 9A-9G are illustrations of various embodiments of fishing lure kits, according to the present invention.

DESCRIPTION

Figure 2A:
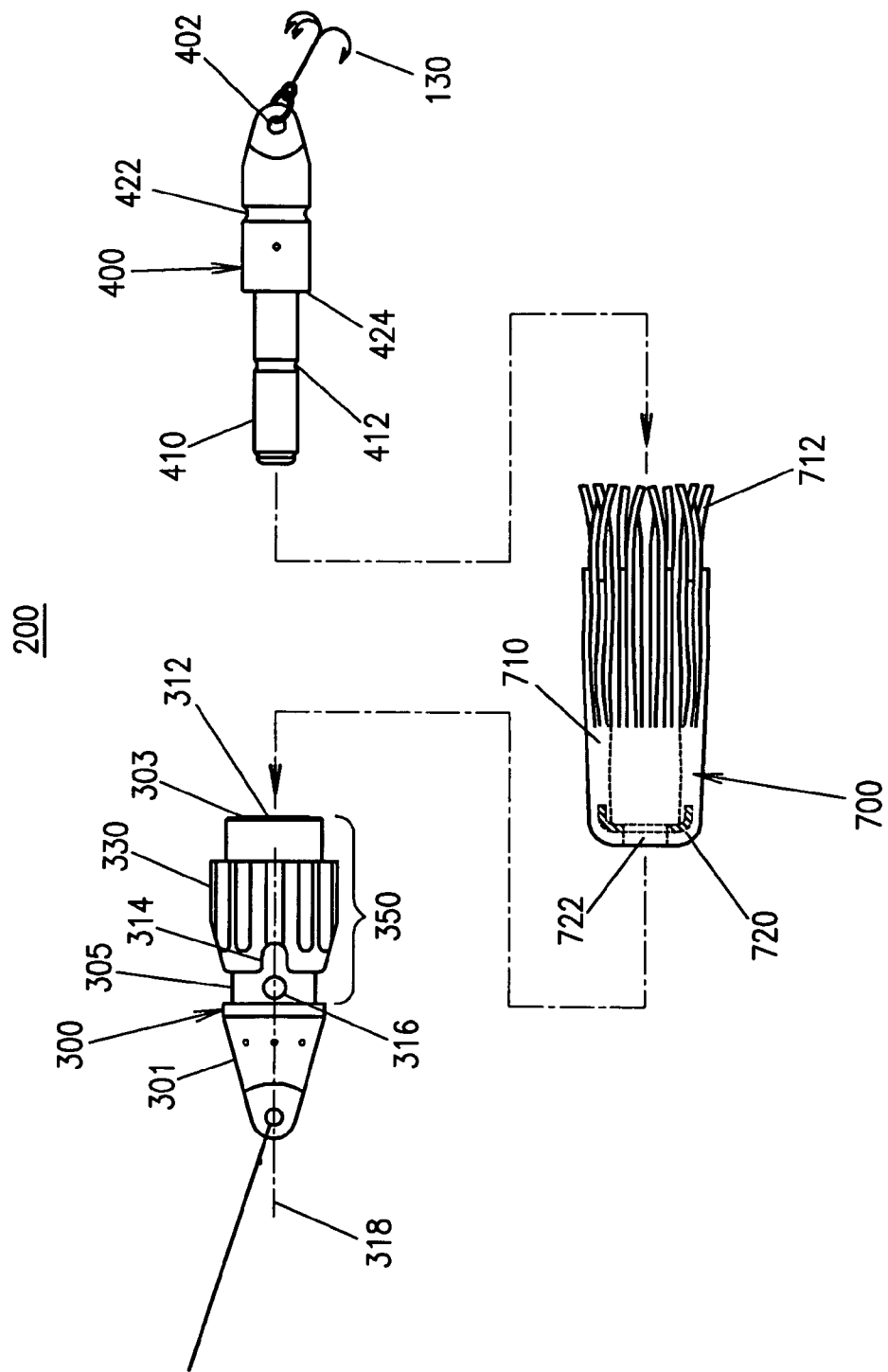
FIG. 2A is a partially exploded view of an embodiment of a fishing lure, according to the present invention.

FIG. 2A is a partially exploded view of an embodiment of a fishing lure, according to the present invention. In some embodiments, lure 200 includes head 300, tail 400, and skirt 700.

In some embodiments, head 300 includes locking (quick release) mechanism 350, operated by slide 330 on head shaft 303. Tail 400 includes tail shaft 410, which is formed with groove 412. Shaft 410 inserts into receiver 312 of head shaft 303, and groove 412 is locked by locking mechanism 350. When slide 330 is pushed up on shaft 303, groove 412, and therefor tail 400, is released by head 300. Slide 330 may only release mechanism 350 if notches 314 are lined up with posts 316. If slide 330 is rotated about axis 318 of head core 301 (as shown in FIG. 2B) so that notches 314 do not line up with posts 316, then tail 400 cannot be released unintentionally.

Figure 2B:
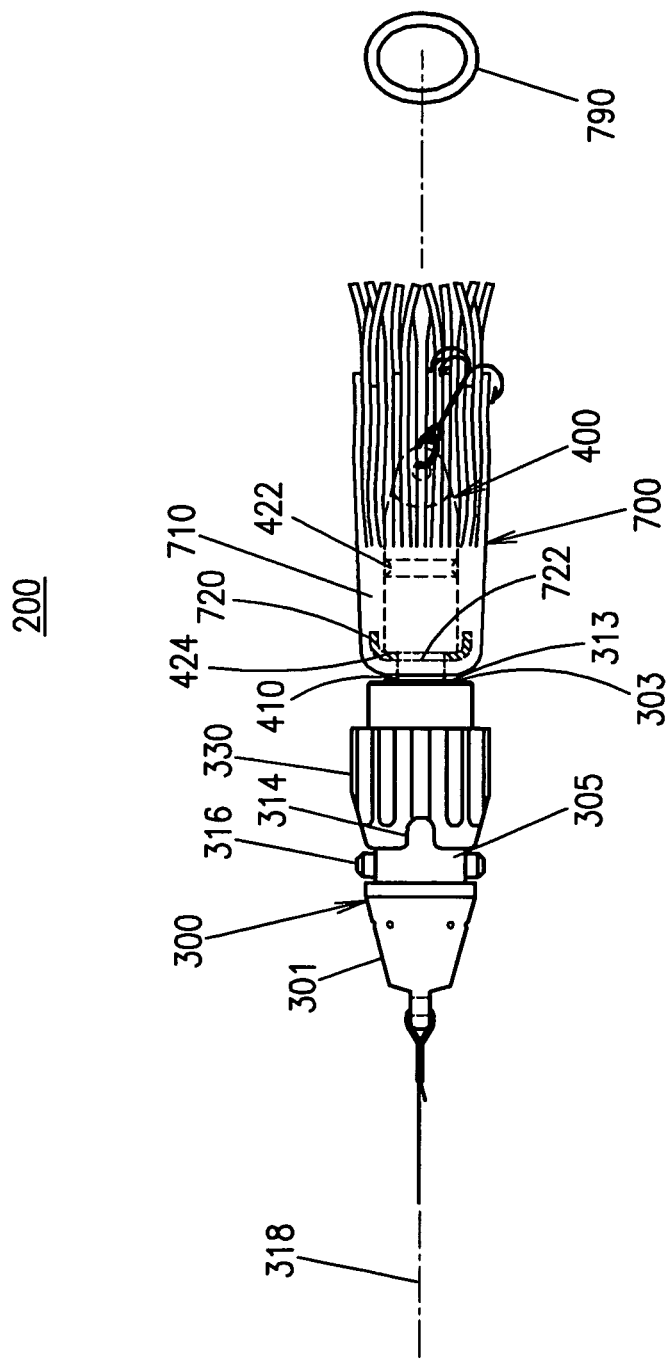
FIG. 2B is an assembled view of an embodiment of a fishing lure, according to the present invention.

FIG. 2B is an assembled view of an embodiment of a fishing lure, according to the present invention. In some embodiments, skirt 700 includes shell 710, secured on ring 720. In some embodiments, shell 710 is a flexible material (e.g., rubber, vinyl, latex). Ring 720 is equipped with hole 722, which fits over shaft 410 of tail 400, and is secured between edge 424 of tail shaft 410 and edge 313 of head shaft 303.

In some embodiments, shell 710 is not equipped with ring 720. In some embodiments, shell 710 (or another type of skirt) is fastened to tail 400 with o-ring 790, about groove 422 in tail 400. In some embodiments, groove 422 is 0.087 inches wide, and is located approximately 0.50 inches from the start of tail surface 424. In some embodiments, o-ring 790 is formed of black rubber with an inner diameter of 0.375 inches and an outer diameter of 0.594 inches. In some embodiments, skirt 710 is attached both to ring 720 and at groove 422 (with o-ring 790).

FIGS. 3A, 3A1, and 3A2 are side, end, and cut views of an embodiment of a lure head with a quick release mechanism, according to the present invention. In some embodiments, head 300 is approximately 1.825 inches long, and head core 301 is approximately 0.769 inches long and has a maximum diameter of approximately 0.560 inches. One end of head core 301 is roughly conical, at about a 15 degree half-angle, having a 0.140 inch radius blunt end at its peak and short (0.120 inch) cylindrical base 309. The other end of head core 301 is cylindrical transition 305, taking up approximately 0.312 inches of length, and having an outer diameter of 0.460 inches.

Head 300 includes hole 317, approximately 0.125 inches in diameter, through transition 305, 0.090 inches from edge of cylindrical base 309. Pin 316 has a diameter of approximately 0.125 inches and is fixed in hole 317. Pin 316 prevents motion of slide 330, when it is desired to secure tail 400 in head 300.

In some embodiments, hole 317 is through transition 305, and one pin 316 is pushed through. In some embodiments two small pin 316 units are used. In some embodiments, two or more holes 317, are formed at different locations around head core 301, equipped with pins 316, and notches 314 in slide 330 are formed to be capable of rotating to match their positions. In some embodiments, notches 314 are approximately 0.16 inches long and approximately 0.14 inches wide. In some embodiments, portions of pin 316 may be colored red (e.g., red anodize, red glaze), in order to given the appearance of eyes, thus making lure 200 more attractive to fish.

In some embodiments, head shaft 303 has an outer diameter of approximately 0.375 inches, an inner diameter of approximately 0.250 inches and a length of approximately 0.744 inches. In some embodiments, spring 340 has a diameter of approximately 0.390 inches and a free length of approximately 0.5 inches. In some embodiments, spring 340 is formed of SS 302-304 wire of 0.035 inch diameter. Spring 340 is placed around head shaft 303, against surface 304 (at the end of transition 305), which has a diameter of approximately 0.46 inches, sufficient to retain spring 340.

Head shaft 303 is provided with three countersunk holes 322, transitioning from 0.110 inches to 0.078 inches (30 degrees), at even spacing (120 degrees) around head shaft 303, approximately 0.24 inches from its end (surface 312). Bearings 324 are inserted in holes 322 (which retain bearings 324). In some embodiments, these dimensions are relaxed to improve functionality and to allow for easier assembly. For example, countersunk holes 322 may transition from 0.118 to 0.086 inches. In some embodiments, head core 301 may be ellipsoidal (or have another shape) instead of conical, to improve fishing in various conditions.

In some embodiments, head core 301, transition 305, and shaft 303 are formed of 6061-T6 aluminum. In some embodiments head core 301, shaft 303, and transition 305 are formed from one piece of material. In some embodiments head core 301, transition 305, and shaft 303 (or portions thereof) are finished with blue anodize. In some embodiments, the step between transition 305 and head core 301 is eliminated and both are changed to a diameter of 0.500 inches. It will a apparent to those skilled in the art that head core 301 can be formed of many materials (e.g., other aluminum alloys, stainless steel, other metals, ceramics, composites) and/or treated with other finishes (e.g., other colors of anodize, glazing, anodic coatings, bluing, glowing).

In some embodiments, slide 330 is 0.870 inches long, having surface 333, grip portion 331 and lock portion 332. Starting at grip portion 331, slide 330 has a first inner diameter of 0.47 inches (over 0.532 inches), a second inner diameter of 0.400 inches (over 0.244 inches), and a third inner diameter of 0.43 inches (over 0.094 inches). In some embodiments, these dimensions are relaxed to improve functionality and to allow for easier assembly. For example, in some embodiments, slide 330 has first inner diameter of 0.48 inches, second inner diameter of 0.395 inches, and third inner diameter of 0.438 inches.

In some embodiments, grip portion 331 is 0.700 inches in diameter and 0.619 inches long, having a cylindrical portion 0.338 inches long, ending in a 15 degree conical taper ending in a truncated outer diameter of 0.546 inches, with a 0.030 inch rounded edge.

In some embodiments, lock portion 332 is 0.245 inches long with an outer diameter of 0.530, having its end is bezeled to 0.010 inches at 45 degrees. In some embodiments, the step between grip portion 331 and lock portion 332 may be eliminated and both changed to a diameter of 0.750 inches. In some embodiments, a 0.125 radius blunt at the end is added.

In some embodiments, slide 330 is formed of 6061-T6 aluminum alloy. In some embodiments slide 330 has a bright chrome finish. Of course, those skilled in the art will recognize that in some embodiments, slide 330 is formed from many other materials (e.g., stainless steel, other aluminum alloys, metals, ceramics, composites) and/or treated with many types of finishes (e.g., anodic coatings, bluing, glazes).

Slide 330 fits over head shaft 303 against spring 340, and is retained by ring 342. Ring 342 has and inner diameter of approximately 0.325 inches and outer diameter approximately 0.425 inches. In some embodiments, ring 342 is formed of SS 302-304, of 0.050 inch diameter. Ring 342 seats in groove 320, having a width of approximately 0.05 inches, an annular radius of approximately 0.025 inches (depth of 0.025 inches, width of 0.050 inches), provided in head shaft 303, approximately 0.090 inches from surface 312. Ring 342 is larger than second inner diameter 336 of slide 330. Thus, slide 330 may move along head shaft 303, confined by ring 342 and post(s) 316. In its relaxed position, slide 330 is held against ring 342 by force of spring 340. In some embodiments, posts 316 are formed of soft plastic or other materials and an additional inner edge in slide 330 is added to stop forward (non-relaxed) motion of slide 330 against surface 304, rather than posts 316.

When slide 330 is in its "relaxed" position, second inner diameter 336 of approximately 0.400 inches is positioned around balls 324, forcing them into holes 322. When slide 330 is moved against the force of spring 340, and notches 314 slide around posts 316, third inner diameter 334, 0.430 inches (larger than second inner diameter 336), is positioned around balls 324, allowing them to move outward from holes 322, but not to escape from head 300. Thus by action of slide 330, balls 324 move radially with respect to head shaft 303, freeing tail 400.

FIG. 3B is a plan view, from a rotated perspective, of an embodiment of a lure head core, according to the present invention. FIG. 3B is rotated 90 degrees from the view shown in FIG. 3A. It can be seen that flange 326 of head core 301 is flat, and approximately 0.080 inches wide, containing hole 302 (of approximate diameter 0.125 inches), for tying on a line. Flange 326 is formed by cut-outs of radius approximately 0.313 inches, around hole 302. These dimensions are provided as exemplary, and it is to be understood that hole 302 may be larger or smaller or shaped to accommodate a ring. In some embodiments an axial hole, through which a line may be tied, replaces hole 302. Further, the area of flange 326 may be more flattened or curved or otherwise shaped to hold a ring or line in a given alignment and to introduce different swim patterns ("action").

In some embodiments, head core 301 is equipped with one or more intake holes 327 and one or more jets 328, so that when lure 200 is pulled through water, water and or air enters through intake 327 and exits through jets 328. Thus turbulence may be caused around lure 200, to attract fish to strike it. In some embodiments, there are two intake holes 327, having diameters of approximately 0.125 inches, and three each jets 328, having diameters of 0.063 inches.

It is to be understood by those skilled in the art, that given dimensions of head 300 and its parts are exemplary, and that head 300 may be scaled and/or re-proportioned for various fishing functions, environments, and purposes. For example, portions of head 300 could be made larger or smaller to make the overall mass of lure 200 increase or decrease, while leaving the inner dimensions of head shaft 303 constant, so it receives one size of tail shaft 410. In some embodiments, head 300 may be more elliptically shaped and the step between head core 301 and transition 305 removed. It is also to be understood that in some embodiments, quick release mechanisms known to the art are adapted to perform the functions of mechanism 350, while retaining the spirit of the invention.

FIG. 3C is a cut line view of an embodiment of a head shaft and bearings, according to the present invention. A cross section of head shaft 303 is shown, with counter-sunk holes 322. Holes 322 are formed with cone half-angle 323 of approximately 15 degrees. It can be seen that bearings 324 (for example 0.094 inch stainless steel balls) fit into holes 322, but do not fall through them. However, a portion of each of bearings 324 is capable of protruding through holes 322 into a portion of receiver 312.

FIG. 3D is a partial sectional of an embodiment of a quick release mechanism, according to the present invention. Locking mechanism 350 is shown in its "open" (release) position and tail 400 is partly pulled out. Spring 340 is compressed between surface 304 of head transition 305 and surface 333 of slide 330. Spring 340 applies force on slide 330, keeping surface 335 pressed against ring 342 when locking mechanism 350 is "closed" (tail secured), as shown in FIG. 3E.

When slide 330 is against ring 342, surface 336 presses balls 324 radially inward to protrude through holes 322. Balls 324 press into groove 412 of tail shaft 410, thus retaining tail 400 in receiver 312 of head 300. When it is desired to release tail 400, slide 330 is moved away from ring 342, bringing surface 334 over balls 324 and holes 322. Balls 324 are free to move radially outward in holes 322, freeing groove 412 of shaft 410, thus freeing tail 400 from head 300.

FIG. 3E is a partial sectional view of an embodiment of a locking mechanism, rotated 90 degrees from FIG. 3D, according to the present invention. Locking mechanism 350 is shown in its "closed" position and tail 400 is fully inserted. In some embodiments, two notches 314 are disposed 180 degrees apart around slide 330. When slide 330 is rotated with respect to head 301, around shaft 303 and transition 305, notches 314 are aligned with posts 316. When notches 314 are in line with posts 316, slide 330 can move in direction 338, unlocking mechanism 350, and releasing tail shaft 410.

In some embodiments, grip portion 331 is formed with scallops 339. In some embodiments, 12 scallops 339 are positioned evenly around grip portion 331 at 30 degrees. Scallops 339 provide both a means of causing water turbulence and for providing a grip-able surface. Scallops 339 are cut with a radius of approximately 0.046 inches and extend for a length of approximately 0.510 inches along grip portion 331, including a portion of the conical taper (approximately 0.172 inches). In some embodiments, a portion of slide 330 is roughened by sand or bead blasting, knurled, as by cutting a pattern in it, or machined by any number of methods known to the art, to achieve a grip-able surface.

FIG. 3F is an end view of an embodiment of a slide, according to the present invention. Scallops 339 and surface 335 can be seen on slide 330.

FIG. 4A1 is a plan view of an embodiment of a tail, according to the present invention. In some embodiments, tail 400 is approximately 2 inches long. Tail 400 includes shaft 410, which is approximately 0.938 inches long and 0.240 inches in diameter (fitting inside receiver 312 of head 300) and tail core 420, which is approximately 1.063 inches long and 0.375 inches in diameter.

In some embodiments, tail core 420 terminates in a truncated cone, having a 15-degree half-angle and an end rounded to a 0.140 inch radius. Tail flange 403 is formed in the rounded portion, being 0.080 inches thick, formed by 0.188 inch radius cuts on either side of flange 403 into the rounded end. Hole 402, of approximate diameter 0.125 inches is through flange 403. Hole 402 is capable of attachment to one or more hooks or a line to another lure.

In some embodiments tail shaft 410 includes groove 412, which is approximately 0.067 inches wide, suitable for balls 324, so that it will lock into locking mechanism 350 of head 300. Groove 412 is 0.52 inches from the end of tail shaft 410 and 0.418 inches from the start of tail core 420 (surface 424).

Various embodiments of locking mechanism 350 may require different configurations of tail shaft 410. It is to be understood that many quick release mechanisms known to the art could be adapted to various embodiments head 300, requiring alteration to tail 400, particularly shaft 410 and/or groove 412. However, an advantage of mechanism 350 is that it allows tail 400 to rotate (swivel).

In some embodiments, tail 400 is equipped with scent chamber 430. In some embodiments, scent chamber 430 is approximately 1.3 inches long and 0.093 inches in diameter. Scent chamber 430 is used to contain and release bait scents, for example squid oil. Scent (bait) is poured into scent chamber 430 through pour hole 431. Tail 400 is equipped with one or more small release holes 434, having diameter approximately 0.031 inches, so that scent trickles slowly out of chamber 430 into the water. In some embodiments release holes 434 are a pair of holed formed by drilling radially through tail 400, and chamber 430, 1.188 inches from pour hole 431. Release holes 434 are small so that scent will release over a substantial period of time.

In some embodiments, pour hole 431 is sealed with plug 432, formed from nylon. Plug 432 has a cylindrical portion 0.125 inches long and 0.093 inches in diameter, having a 0.010 inch bezel at 45 degrees, which fits in chamber 430. Plug 432 has a head portion 0.031 inches thick and 0.208 inches in diameter to prevent it from getting stuck in chamber 430. In some embodiments, chamber 430 has an internal thread and plug 432 is threaded. In some embodiments, plug 432 is formed of cork, rubber, or another compressible material.

Embodiments of given approximate dimension are exemplary, and it is to be understood that the dimensions and mass of tail 400 are adaptable to different configurations for different types of fishing. If a very long skirt is to be used, a longer version of tail 400 can be used. For tying on different skirts, edge 424 may be made larger or smaller or blunt radius may be added, and/or groove 422 can be reduced, enlarged, or omitted. Depending on the types of hooks or other attachments to be used with lure 200, hole 402 and flange 403 can be increased or decreased in size. Various tails may differ not only in scale, but have different proportions.

FIGS. 4A2 and 4A3 are plan views of embodiments of tails, according to the present invention. FIGS. 4A2 and 4A3 are views of embodiments of tail 400, in which tail core 420 is increased in size to a 2-inch length and a 3-inch length (and therefore also increased in mass) for different fishing applications.

In some embodiments, tail 400 is formed of aluminum. In some embodiments, it is anodized blue or otherwise treated to resist corrosion. In some embodiments, tail 400 is formed of other materials, such as stainless steel, ceramics, or composites, which may also resist corrosion.

FIG. 4B is a cut view of an embodiment of a tail with a drag chute, according to the present invention. In some embodiments, tail 450 is equipped with releasable drag chute 500. However, tail 450 has the same sized tail shaft 410 and groove 412 as tail 400, allowing it to be used with the same head 300. Chute 500 is formed of sturdy nylon or another rugged, outdoor-fabric, to resist degradation from ocean water and tearing from use.

In some embodiments, body 452 of tail 450 is elongated, to a length of approximately 6.94 inches to fit ribs 460, which are approximately 4.69 inches long. Ribs 460 are outfitted with rivet holes 466 (approximately 0.078 inches) to which chute 500 attaches.

In some embodiments, pivot hole 463 (approximately 0.078 inches) of each rib 460 attaches to metal ring 482 (1-inch ID, being 0.063 inches thick, with a 0.125-inch gap), fastened around crown 480, so that they may lay stored against tail body 452 then open to an angle of approximately 60 deg. Hook 462 of each rib 460 is held by o-ring 484 (1.125-inch ID; 1.313-inch OD), which provides radial tension toward crown 480, forcing ribs 460 toward a semi-open "retrieving" position.

Rib 460 terminates in tab 464, approximately 0.094 inches thick. Locking mechanism 470 includes inner surface 472, having an inner diameter of approximately 1.187 inches. Inner surface 472 is capable of exerting a radial inward force on tabs 464 of ribs 460 against the force of o-ring 484, so as to keep ribs 460 in a "trolling" (chute closed) position, parallel to tail body 452.

Cap 474 (1.375-inch diameter, 1.313-inches long) of retainer 473 holds one end of spring 475 (approximately 0.875-inch free-length, 0.480-inch outer diameter, of 0.063 diameter SS), the other end of which presses against flange 454 of tail body 452. Thus, when force of approximately 6 lbs. (the pull of fish 491) is applied to locking mechanism 470, in direction 492, locking mechanism 470 slides in direction 492, freeing tabs 464. This allows the force of o-ring 484 on hooks 462 of ribs 460 to open drag chute 500. Thus, tail 450 with drag chute 500 can look like a lure before fish 491 is hooked, but open into a drag chute after fish 491 is hooked and tensile force on locking mechanism 470 (in direction 492) exceed approximately 6 lbs.

FIGS. 4C and 4D are plan views illustrating an embodiment of a drag chute in use. Ribs 460 are released and chute 500 opens in direction 465 when fish 491 pulls line 493 through the water away from the user in direction 492, providing maximum resistance (drag) when fish 491 is fighting. Also, ribs 460, and thus chute 500, will collapse in direction 485, when pulled in direction 486 (reeling-in by the user), thus providing minimal resistance as fish 491 is reeled-in by reel 497.

FIG. 4E is an end view of a locking mechanism, according to the present invention. Locking mechanism 470 is equipped with vent holes 476 to reduce drag as tail 450 is pulled through the water, and to facilitate drainage of water when tail 450 is removed from the water. Grooves 478 (12 at 30-deg spacing, approximately 0.094 wide and 0.370 long) facilitate manual manipulation of release mechanism 470 and cause water turbulence. Holes 479 eliminate vacuums and facilitate drainage of retainer 473.

FIG. 4F is a cut view through an embodiment of a tail, according to the present invention. As with tail 400 (see FIG. 4A1), in some embodiments, bait chamber 430 of tail 450 is bored in extended tail shaft 452, with fill hole 431 and deployment holes 434.

FIG. 4G is a partial assembly view of an embodiment of a tail drag chute, according to the present invention. Shaft 452, spring 475, locking mechanism 470, and retainer 473 are shown in assembly position. Retainer 473 also has a drain hole 479.

FIG. 4H is a front view of an embodiment of a crown, according to the present invention. Crown 480 is equipped with slots 485, into which ribs 460 assemble. Crown 480 is also equipped with drain holes 476. Crown 480 has a central hole 486, to receive tail shaft 410.

FIG. 4J is a cut view of an embodiment of a crown, according to the present invention. It can be seen that hook 462 of rib 460 stops against the bottom of slot 485 of crown 480, limiting the maximum extent chute 500 can open (roughly 8-in in diameter).

FIGS. 4K and 4L are illustrations of an embodiment of a tail assembly method, according to the present invention. Ribs 460 are inserted on metal ring 482, through hole 463. Ring 482 and ribs 460 are pressed on to crown 480, and o-ring 484 is slipped over slots 485 and rib hooks 462.

FIGS. 5A and 5B are end and cut views of an embodiment of a drag chute, according to the present invention. Chute 500 includes sleeves 510, inner hem 520, and outer hem 530. Ribbons 540 are attached around outer hem 530. Sleeves 510 may run the length of chute 500, or may be broken in segments 512.

FIG. 5C shows an embodiment of a drag chute assembled on ribs and crown, according to the present invention. Chute 500 is attached to ribs 460 by rivets 504, through holes 466. Ribs 460 run through sleeves 510 or segments 512, thereof.

FIG. 6A is a cut view of an embodiment of a drag chute release mechanism with adjustable release force, according to the present invention. Mechanism 600 provides for an adjustable compression force on spring 475, to allow the user to set the tensile force at which chute 500 will be released.

FIG. 6B is an end view of an embodiment of an adjustable release mechanism, according to the present invention. Adjustable release mechanism 600 is provided with vent holes 479 and grooves 478.

FIG. 6C is an assembly view of an embodiment of an adjustable release mechanism, according to the present invention. Housing 610 is provided with two sets of internal threads. Tensioner 620 (about 0.718-in max diameter, 2.125-in long, 0.500-in ID) threads into threads 612 (0.875-9 UNC-2B) of housing 610. Spring 475 is placed with washers 630 inside tensioner 620. Tail body 452 goes through spring 475 and washer 630, tensioner 620, and housing 610. End piece 640 threads into threads 614 (1.000-12 UNF 2B) of housing 610, and presses against flange 454 of tail body 452.

By changing the position of tensioner 620 with respect to housing 610 (by screwing threads 622 in or out of threads 612), the amount of compression force on spring 475 is changed. Thus, different amounts of force are required to release mechanism 600, depending on the adjustment of tensioner 620.

FIG. 6D is an end view of an embodiment of a tail body flange, according to the present invention. Flange 454 of tail body 452 is roughly triangular in shape, to allow water to pass by, reducing drag, and allowing the mechanism to drain when removed from the water.

FIGS. 6E and 6F illustrate three tensions of an example release mechanism, according to the present invention. FIG. 6E shows adjustable release mechanism 600 in three different tension settings (although a continuum of tensions can be set). In some embodiments, tensioner 620 is provided with marks 624 (e.g., one, two, and three dots, "low-med-high") to indicate the tension setting, which can be seen by the user. Undercut 626 facilitates cutting of thread 622. FIG. 6F shows that release mechanism 600 changes length 650 from approximately 3.875 inches (low tension, approximately 8 lbs.) to 3.375 inches (high tension, approximately 24 lbs.).

FIG. 6G is a side view of an embodiment of a release mechanism and tail body, according to the present invention. In some embodiments, two sides of tensioner 620 are flattened at area 642, for example to a width of ⅝ inches, to allow a key (or other tool) to be used to help change tension. Grooves 478 facilitate gripping housing 610 during adjustment.

It is to be understood by those skilled in the art that embodiments are exemplary, and that many variations are possible.

FIG. 7A is a plan view of an embodiment of a skirt, according to the present invention. In some embodiments fitted skirt 700 is formed to fit closely around tail 400. In some embodiments (see FIGS. 2A and 2B), skirt 700 fits more loosely, for example, a skirt from another lure, selected for installation on tail 400.

Skirt 700 is formed to fit closely to tail 400. In some embodiments, skirt body 710 is formed from molded or cast rubber, polymer, plastic, or another flexible material. Skirt body 710 is equipped with tail hole 722, which fits over tail shaft 410. In some embodiments, skirt ring 720 is embedded in or attached to skirt body 710 in the vicinity of tail hole 722, to facilitate attachment to tail 400 and strengthening.

In some embodiments, skirt 700 is formed with tentacles 712, to resemble a squid or similar bait. In some embodiments, skirt body 710 is equipped with patterns such as patterns 732 or 734, or another pattern designed to attract fish to strike at lure 200. Skirt body 710 and tentacles 712 may be formed of many different colors (e.g., purple, green, red) or combinations of colors, such as swirls, glitter formed in body 710, pressed patterns, or any other color, colors, textures, or decorations designed to attract fish.

FIG. 7B is a plan view of a pattern for an embodiment of a tentacle skirt, according to the present invention. In some embodiments, tentacle skirt 740 is formed of thin plastic or rubber. In some embodiments, tentacle skirt 740 is made of material of many types and variety of colors, such as Day-Glo orange, green, or any other color designed to attract fish.

In some embodiments, center hole 745 is approximately 0.25 inches in diameter, to match the diameter of tail shaft 410, and grommet 744 is approximately 0.50 inches in diameter. In some embodiments, tentacles 742 are provided in, for example, 2.5, 3.0, 3.5, or 4.0 inch lengths (or any desired length to attract fish), and 0.16 to 0.10 inches wide. In some embodiments, tentacle skirt 740 is plastic material approximately 0.040 inches thick, having radius 743 between tentacles 742, of 0.125 inches.

It is to be understood that the given dimensions are exemplary and that there are many different sizes, thickness, tentacle lengths, colors, tentacle counts, and configurations which will be apparent to those familiar with the art of lure design.

In some embodiments, grommet 744 is attached to center of tentacle skirt 740 to facilitate mounting to tail 400.

FIG. 7C is a diagram of an embodiment of a skirt ring, according to the present invention. Ring 720 is approximately 0.040 inches thick, and 0.50 inches in diameter. Dimples 750 help hold skirt 700 on ring 720.

FIG. 7D is an embodiment of a skirt pattern, according to the present invention. Skirt 730 is formed from a flat sheet. Removals 760 facilitate rolling skirt 730 around tail 400.

FIG. 8A is a top-view of an embodiment of a diving wing for a fishing lure, according to the present invention. In some embodiments, lure 200 is equipped with wing 800 to cause lure 200 to sink during trolling. Wing 800 includes plane 810 and mount 820.

In some embodiments, plane 810 is 0.063 inches thick, approximately 6 inches long and 3 inches wide. Plane 810 is attached to mounting structure 820. Mounting structure 820 includes face 821, which has hole 822 for insertion over tail shaft 410 of lure 200. Diving wing 800 may be formed from many materials (e.g., stainless steel, other metals, composites, plastics) and/or treated with many types of finishes (e.g., anodic coatings, powder coatings, bright chrome). Those skilled in the art will recognized that the dimensions of wing 800 may be scaled up or down or proportions between components may be changed.

FIG. 8B is an end view of an embodiment of a diving wing for a fishing lure, according to the present invention. In some embodiments, wing 810 is W-shaped (resembling a paper-airplane). Outer portions 811 of wing 810 are bent "up" at angle 812 (75 deg) from center portions 813, which are bent "down" at angle 814 (90 deg) to each other.

FIG. 8C is a side view of an embodiment of a diving wing for a fishing lure, according to the present invention. Tab 821 is set at various angles 824 (e.g., 90, 100, 110 degrees) to mount 820, causing lure 200 to sink to and hold at various depths when trolled. Thus lure 200, equipped with wing 800, may be used to fish at different depths for different fish, under different conditions. In some embodiments, wing 800 is set for 45 degrees and towed by a line angled at between roughly 3 and 7 degrees above horizontal.

FIG. 8D is a side view of an embodiment of a diving wing attached to a lure, according to the present invention. Hole 822 of tab 821 of wing 800 is inserted over tail shaft 410 of tail 400 of lure 200. Wing 800 is held at angle 824 (approximately 35 deg) to tail shaft 410.

FIG. 8E is a side view of an embodiment of a lure with a diving wing and a teaser, according to the present invention. In some embodiments, a first lure 200 with a diving wing 800 is attached to a second lure 200 with a skirt 700 and hook 130.

In some embodiments, the first lure 200 is equipped with bait chamber 430, and used to deliver bait ahead of the second lure 200.

FIG. 8F is a side view of an embodiment of a lure with a diving wing, skirt, and hook, according to the present invention. In some embodiments, lure 200 is equipped with diving wing 800, as well as skirt 700, and hook 130.

FIGS. 9A-9G are illustrations of embodiments of fishing lure kits, according to the present invention. In some embodiments parts of lure 200 are stored in kit 900, including at least one complete lure 200.

Figure 9B:
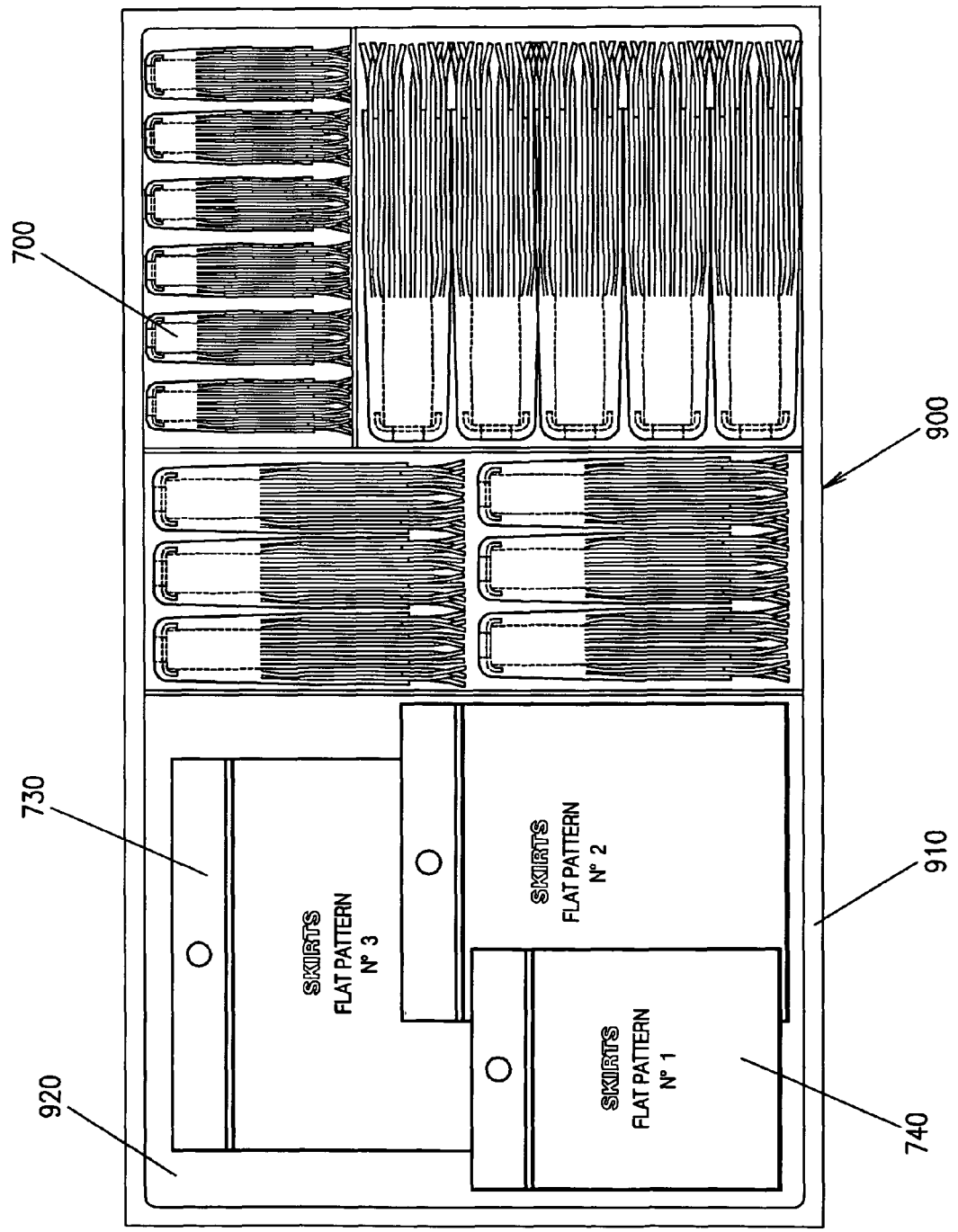

As shown in FIGS. 9A and 9B, in some embodiments, tray 910 includes compartments 920, shaped to fit the various components. For example, various weights of lures and sizes and colors of skirts.

Figure 9C:
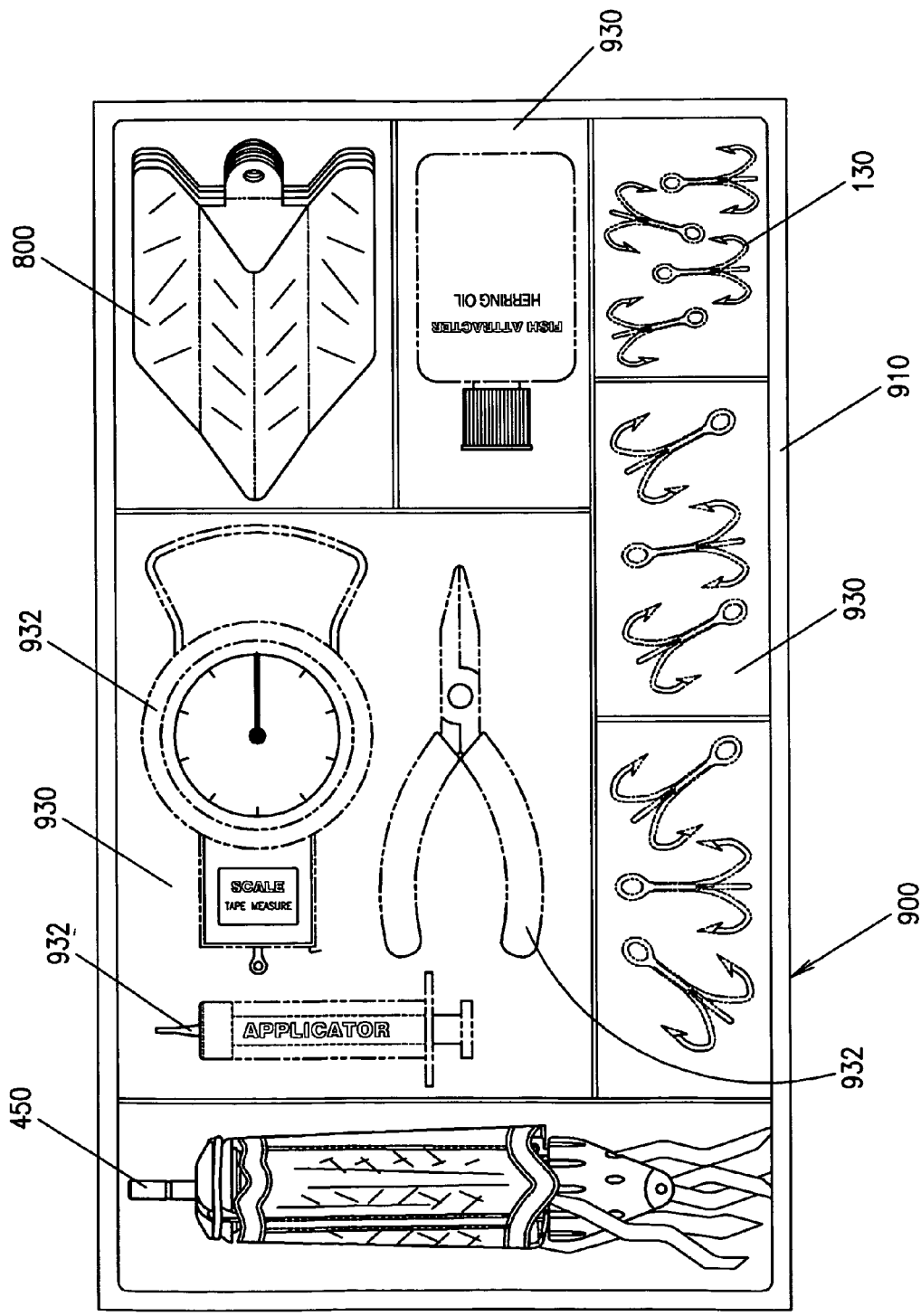

In some embodiments, tray 910 includes accessory compartments 930 for storing accessories such as extra lines, hooks, bait scent, glow-sticks 931. As shown in FIG. 9C, compartments 930 can hold tools 932, as well as hooks 130, and/or tail with drag chute 450.

Figure 9D:
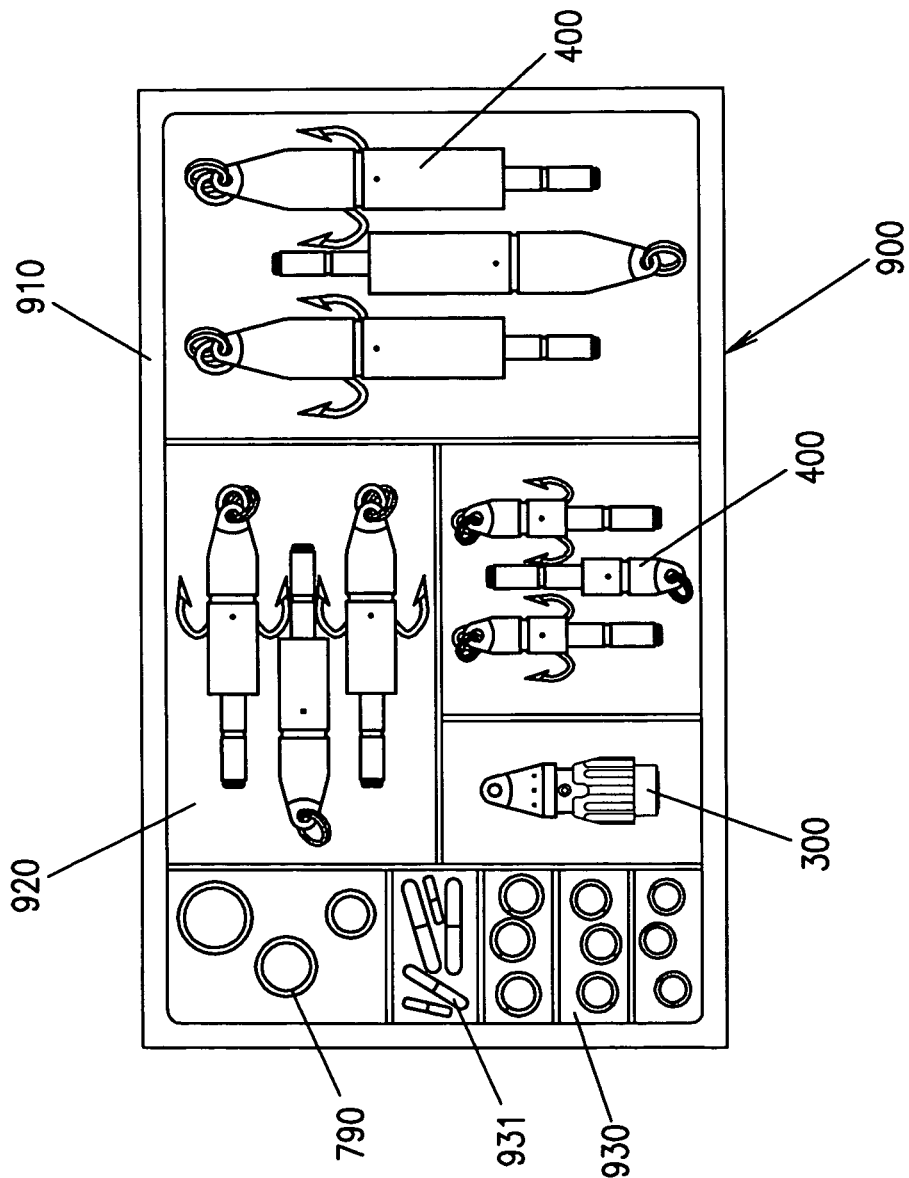
Figure 9E:
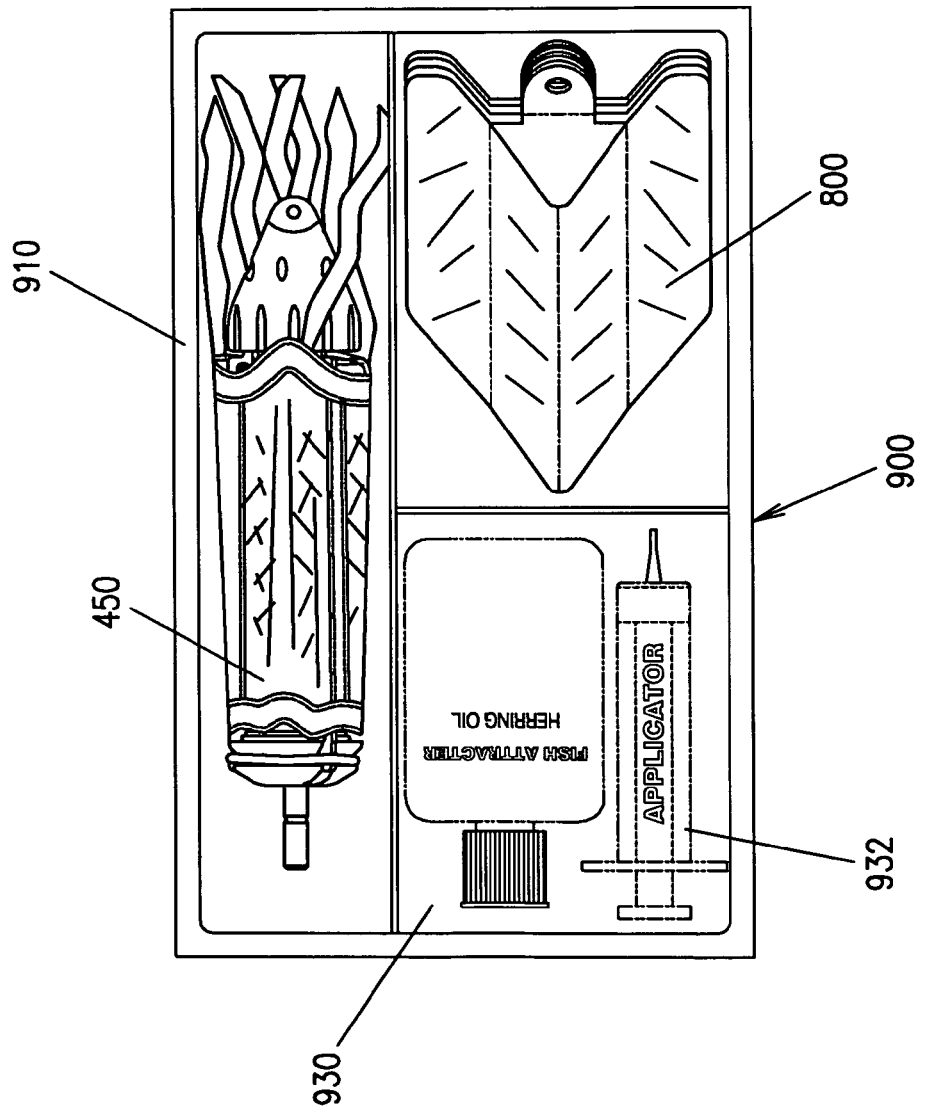
Figure 9F:
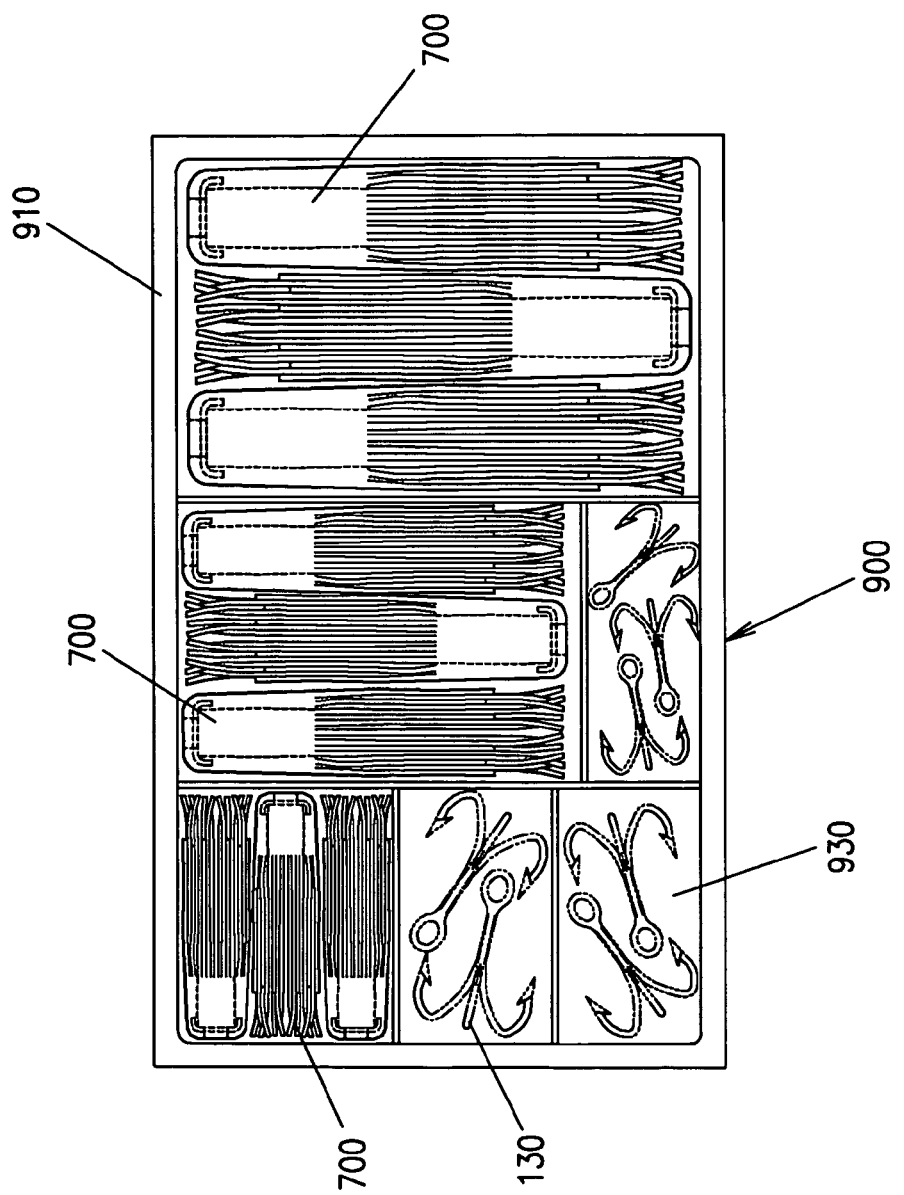
Figure 9G:
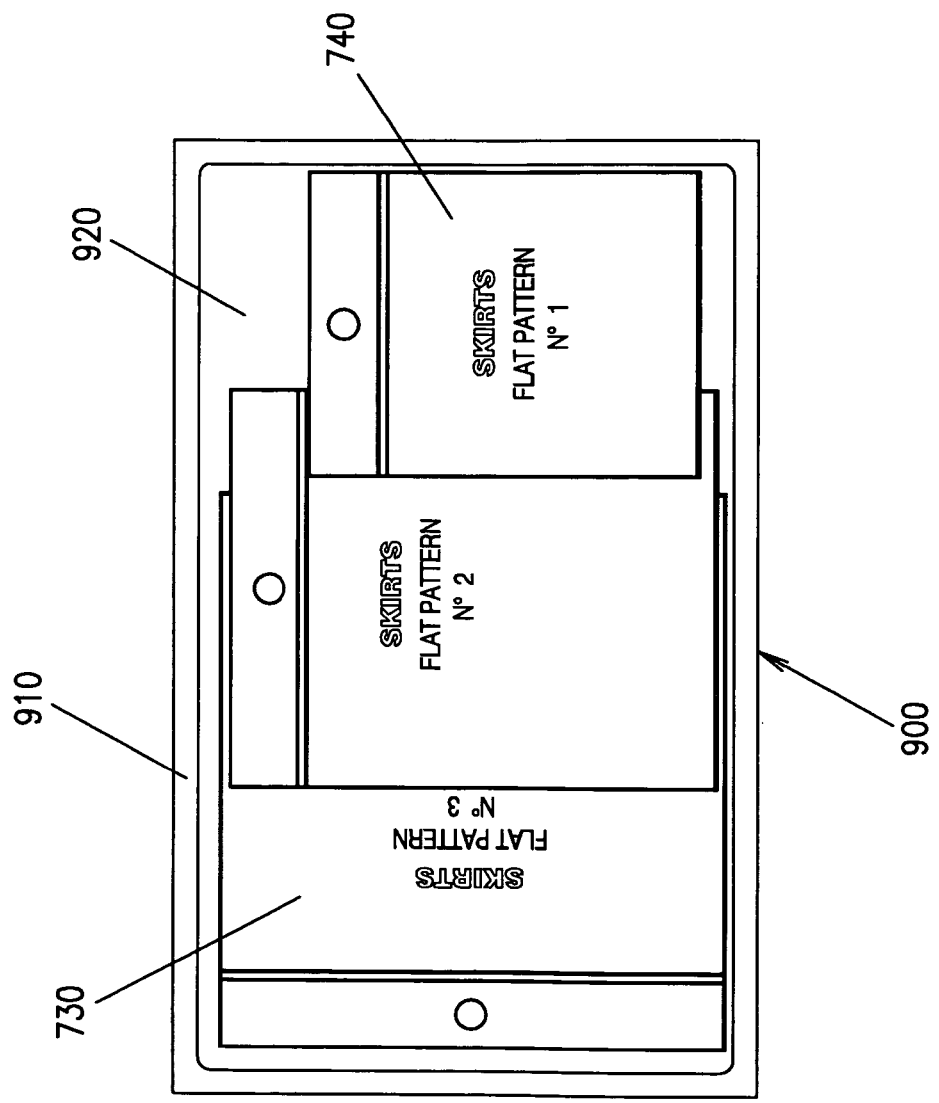

As shown in FIG. 9D, in some embodiments, kit 900 includes at least one variety of head 300 and at least one variety of tail 400. In some embodiments, kit 900 includes skirts 700, 730, and/or 740. In some embodiments multiple tails 400, tail with drag chute mechanism 450, or tails of varying weights and/or shapes, and/or sizes are included.

As shown in FIGS. 9D-9G, smaller versions of trays 910 can be sized to fit in a tackle box, while still containing sufficient lure components.

While various embodiments of the invention have been described, it should be understood that they have been presented by way of example and not limitation. Those skilled in the art will understand that various changes in forms or details may be made without departing from the spirit of the invention. Thus, the above description does not limit the breadth and scope of the invention as set forth in the following claims.

I claim:

1. A fishing lure, comprising:
a head member, said head member having a quick-release mechanism and having means of engaging said head member to an attachment with a fishing line, said attachment with a fishing line forming a fixed engagement of said fishing line to a first end of said head member;
said head member having an axial chamber at a second end of said head member;
a tail member, said tail member removably attachable to said second end of said head member through an operative employment of said quick release mechanism wherein said tail member is removable from the head member while said head member is in said fixed engagement to said fishing line;
said tail member including a shaft, said shaft of said tail member attachable to the head member by an insertion of the shaft into the axial chamber;
a shaft portion at said second end of said head member, said shaft portion including the axial chamber into which the tail shaft is secured by the quick release mechanism;
said quick release mechanism comprises a slide; and
a spring, positioned so as to be compressed by a sliding of the slide, wherein the slide and spring are disposed substantially around the shaft portion of the head member, wherein longitudinal motion of the slide secures or releases the tail member shaft from the axial chamber in the head member.

2. The fishing lure of claim 1, further comprising a lure skirt, having a central hole, said central hole securable around the shaft of the tail member.

3. The fishing lure of claim 2, wherein the lure skirt further comprises an annular grommet, integral to the central hole, and having an inner diameter slightly larger than a diameter of the tail member shaft.

4. The fishing lure of claim 1, further comprising a dive wing capable of being secured to the lure around the tail member shaft, and between the head member and tail member.

5. The fishing lure of claim 4, wherein the dive wing comprises: a planar member; and a mounting plate, and wherein the mounting plate is fastened to the planar member, and comprises means for attaching the wing to the fishing lure.

6. The fishing lure of claim 1, wherein a front portion of said first end of said head member is provided with one or more longitudinal bores, and wherein a rear portion of said first end of said head member is provided with a plurality of water jets, said water jet communicating through said one or more longitudinal bores with water intakes at said front portion of said head member.

7. The fishing lure of claim 1, wherein the shaft of the tail member comprises a bait well.

8. The fishing lure of claim 7, wherein the bait well comprises:
   an axial chamber in the shaft of said tail member;
   a plug, said plug engageable with said axial chamber of said tail member to form a seal of the axial chamber of said tail member; and
   one or more holes communicating between the axial chamber of said tail member to an exterior of the tail member.

9. The fishing lure of claim 1, wherein the quick release mechanism additionally includes means for locking the slide.

10. The fishing lure of claim 9, wherein the tail member shaft further comprises a circumferential groove, and wherein the quick release mechanism further comprises a plurality of balls, dispersed in a circle, about a portion of the head member shaft portion, and secured between the head member shaft portion and the slide, and wherein the balls are secured at a first radius when the slide is in a release position releasing the tail member shaft from the axial chamber in the head member and a second radius which is smaller than said first radius when the slide is in a secure position securing the tail member shaft to the axial chamber in the head member, so as to project radially inward into the axial chamber of the head member shaft portion and securing the tail member by the circumferential groove.

11. The fishing lure of claim 1, wherein the tail member further comprises: a drag chute, the drag chute having an open state and a stored state; and a release mechanism comprising a trigger; wherein, the release mechanism is capable of holding the chute in the stored state, and releasing the drag chute when the trigger is pulled.

12. The fishing lure of claim 1, said head member and tail member are capable of unrestrained axial rotation relative to each other.

13. The fishing lure of claim 1 provided as a kit, said kit, comprising:
   said head member, including said quick release mechanism;
   said tail member, including said shaft, the shaft being removably attachable to said head member through an insertion into the head member; and
   a lure skirt, securable on the shaft, between the head member and tail member.

14. The kit of claim 13, further comprising a storage tray, the tray comprising storage compartments for at least one head member, one tail member, and one lure skirt.

* * * * *